(12) United States Patent
Sato

(10) Patent No.: US 7,858,221 B2
(45) Date of Patent: Dec. 28, 2010

(54) LEAD TERMINAL AND POWER SUPPLY DEVICE

(75) Inventor: Bunya Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 1357 days.

(21) Appl. No.: 10/542,959

(22) PCT Filed: Jan. 14, 2004

(86) PCT No.: PCT/JP2004/000188

§ 371 (c)(1),
(2), (4) Date: Jul. 21, 2005

(87) PCT Pub. No.: WO2004/066446

PCT Pub. Date: Aug. 5, 2004

(65) Prior Publication Data

US 2006/0032667 A1     Feb. 16, 2006

(30) Foreign Application Priority Data

Jan. 23, 2003    (JP)    ............................ P2003-015167

(51) Int. Cl.
*H01M 2/26*    (2006.01)

(52) U.S. Cl. .................. 429/121; 429/122; 429/123
(58) Field of Classification Search .............. 429/121, 429/122, 123
See application file for complete search history.

(56) References Cited

FOREIGN PATENT DOCUMENTS

| JP | 63-110583 | 5/1988 |
|---|---|---|
| JP | 63-145588 | 9/1988 |
| JP | 8-255603 | 10/1996 |
| JP | 2002-25523 | 1/2002 |
| JP | 2003-19569 | 1/2003 |

*Primary Examiner*—Jane Rhee
(74) *Attorney, Agent, or Firm*—Frommer Lawrence & Haug LLP; William S. Frommer; Thomas F. Presson

(57) ABSTRACT

A power supply apparatus in which a battery and a circuit wiring board or boards are electrically connected by using lead terminals. The lead terminal is adapted so that thickness of a welding portion is caused to be thinner than the thickness of a conductive portion. Thus, current for welding flows to much degree in a thickness direction so that electric resistance of the welding portion becomes large, and heat based on the electric resistance also becomes large. From this fact, welding nugget can be enlarged. As the result of the fact that large welding nugget is formed, the lead terminals are welded to terminal portions of the battery with high reliability.

14 Claims, 15 Drawing Sheets

LEAD TERMINAL AND POWER SUPPLY DEVICE

TECHNICAL FIELD

The present invention relates to a lead terminal connected to a connected body with sufficient strength, and a power supply apparatus adapted for electrically connecting a battery and a circuit wiring board or boards by using such a lead terminal or terminals.

This Application claims priority of Japanese Patent Application No. 2003-015167, filed on Jan. 23, 2003, the entirety of which is incorporated by reference herein.

BACKGROUND ART

Hitherto, as a power supply of an electronic equipment such as note type personal computer, mobile telephone, camera integrated type VTR (Video Tape Recorder) and/or PDA (Personal Digital Assistants), etc., a light secondary battery having high energy density is required. As the secondary battery having high energy density of this kind, there is lithium ion secondary battery having energy density larger than that of aqueous electrolyte battery, e.g., lead battery, nickel-cadmium battery and/or nickel-hydrogen battery, etc.

The lithium ion secondary battery includes, e.g., a battery element having cathode and anode, an armored can which is a cylindrical vessel having bottom portion for accommodating the battery element therewithin, and which is electrically connected to the anode so that the armored can serves as anode terminal, and a cover body adapted for closing the opening portion of the armored can and electrically connected to the cathode so that the cover body serves as an external cathode terminal. In the lithium ion secondary battery, as the result of the fact that cover body is press-fitted into the opening portion of the armored can through gasket thereafter to caulk the opening portion of the armored can so that the cover body is fixed to close the opening portion of the armored can, the battery element is hermetically sealed into the armored can. For this reason, in the lithium ion secondary battery, the armored can of the external anode terminal and the cover body of the external cathode terminal are placed in insulating state by gasket.

In the case where the lithium ion secondary battery of such a configuration is used as a power supply of the above-described electronic equipments, the lithium ion secondary battery is mounted at the electronic equipment in the state of battery pack. As the battery pack, there is a battery pack described in the Japanese Patent Application Laid Open No. 2002-343320 publication.

In the battery pack 100, as shown in FIG. 1, e.g., two lithium ion secondary batteryies 101 are accommodated within a pair of accommodating cases 103 in the state connected to a circuit wiring board 102 for performing overcharge protection, over-discharge protection and/or charge/discharge control, etc. with respect to the battery. In concrete terms, the lithium ion secondary batteries 101 are connected to the circuit wiring board 102 in series state through belt-shaped lead terminals 104 consisting of conductive metal, etc., e.g., nickel, iron or stainless steel, etc. At this time, in the battery pack 100, e.g., connection between the armored can 105 serving as external terminal and/or the cover body 106 in the lithium ion secondary battery 101 and the lead terminals 104 is performed by using the resistance welding method.

As shown in FIG. 2, this resistance welding method is a method of welding the lead terminal 104 and the cover body 106 by making use of heat by electric resistance produced between the lead terminal 104 and the cover body 106 in allowing current of about 1200 A to flow from one side of a pair of electrode rods 107, 108 disposed on the principal surface of the lead terminals 104 to the other side electrode rods thereof in the state where, e.g., lead terminal 104 is caused to be in contact with the cover body 106, etc.

In the case of welding lead terminals 104 with respect to the armored can 105 and/or the cover body 106 by such a method, it is necessary to thin thickness of the lead terminal 104 to a certain degree. In concrete terms, if the thickness of the lead terminal 104 consisting of conductive metal, etc. e.g., nickel or iron, etc. is not caused to be equal to about 0.15 mm, it becomes difficult to perform welding in which welding reliability has been enhanced.

The reason thereof is as follows. As shown in FIG. 3, in the case where, e.g., lead terminal 104 having thickness of about 0.2 mm is used, because the thickness of the lead terminal 104 is too thick, a current flowing in the lead terminal 104, so called reactive current at a path indicated by arrow X in FIG. 3 would take place at a portion of current flowing in the electrode rod 108 from the electrode rod 107 in performing resistance welding.

For this reason, in the welding between the lead terminal 104 and the armored can 105 or the cover body 106, current at a path indicated by arrow Y in FIG. 3, i.e., current flowing in a thickness direction of the lead terminal 104 to reach the armored can 105 or the cover body 106, so called active current is decreased so that calorific value by electric resistance of the lead terminal 104 is reduced. Thus, in welding between the lead terminal 104 and the armored can 105 or the cover body 106, there are instances where welding blocks, so-called welding nuggets 109 formed as the result of the fact that the lead terminal 104 and the armored can 105 or the cover body 106 are molten with each other by heat of electric resistance by active current of the lead terminal 104 is reduced so that welding strength may be weakened.

Particularly, in the case where lead terminal 104 is formed by conductive metal, etc. containing, e.g., copper, silver or aluminum, etc. having electric resistance smaller than that of the armored can 105 or the cover body 106, ratio of reactive current becomes large among current flowing in the electrode rod 108 from the electrode rod 107 to the electrode rod 108. As a result, welding strength between the lead terminal 104 and the armored can 105 or the cover body 106 is further weakened.

In such lithium ion secondary battery 101, in the case where, e.g., the battery pack 100 is erroneously fallen down in detaching it from electronic equipment, etc. so that the lithium ion secondary battery 101 undergoes impact, etc., because welding strength between the lead terminal 104 and the armored can 105 or the cover body 106 is weak, there are instances where connection between the lead terminal 104 and the armored can 105 or the cover body 106 is broken to allow the battery pack 100 to be brough into unusable (unavailable) state.

Moreover, in the battery pack 100, in the case where the lead terminal 104 is thinned for the purpose of enhancing welding reliability with respect to the armored can 105 and/or the cover body 106, electric resistance of current flowing in a length direction in the lead terminal 104 in charging/discharging the lithium ion secondary battery 101 would become large. For this reason, in the battery pack 100, there are instances where the lead terminal 104 having large electric resistance may be heated by current of charge/discharge operation so that the lithium ion secondary battery 101 is deteriorated by such heat. Namely, in the battery pack 100, it becomes difficult to use the lithium ion secondary battery 101 as a power supply of recent electronic equipments caused to further have high function and high performance so that there is required large current discharge in which discharge operation is performed at current of about 1 C to 2 C per battery.

Further, in such lead terminal, because electric resistance is large, voltage drop takes place in the lithium ion secondary battery 101 at the time of charge or discharge operation. As a result, power loss takes place, leading to lowering of energy utilization efficiency.

DISCLOSURE OF THE INVENTION

An object of the present invention is to provide a novel lead terminal and a power supply apparatus using such a lead terminal or terminals, which can solve problems that prior arts as described above have.

Another object of the present invention is to provide a lead terminal welded to a connected body with suitable connection strength and having suppressed electric resistance.

A further object of the present invention is to provide a power supply apparatus having enhanced (improved) connection reliability between battery and lead terminal, and excellent in large current load characteristic.

The lead terminal according to the present invention is directed to a lead terminal for electrically connecting a first connected body and a second connected body, the leading terminal being a plate terminal consisting of conductive metal, the leading terminal including a welding portion in which electricity (current) is caused to flow in the state caused to be in contact with an external terminal of the first connected body so that the welding portion is resistance-welded to the external terminal of the first connected body, a connecting portion connected to an external terminal of the second connected body, and a conductive portion positioned between the welding portion and the connecting portion, and serving to allow the welding portion and the connecting portion to electrically conduct, wherein the lead terminal is formed so that the thickness of the welding portion is thinner than the thickness of the conductive portion.

In this lead terminal, since the welding portion which is resistance-welded to the external terminal of the first connected body is thinner than the conductive portion, it is possible to allow large part of current flowing in the welding portion in welding the external terminal of the first connected body and the welding portion to flow in thickness direction of the welding portion.

In the lead terminal according to the present invention, current for resistance-welding flows to much degree in thickness direction of the welding portion so that electric resistance of the welding portion is increased. As a result, calorific value produced at the contact portion between the external terminal of the first connected body and the welding portion becomes large. Thus, it is possible to perform resistance-welding of the welding portion with respect to the external terminal of the first connected body with high welding strength.

In this lead terminal, since current for resistance-welding flows to much degree in thickness direction of the welding portion so that electric resistance of the welding portion becomes large, heat produced at the welding portion becomes large by increased electric resistance. Thus, it is possible to perform resistance-welding of the welding portion with respect to the external terminal of the first connected body with high welding strength.

In the lead terminal according to the present invention, since the conductive portion is caused to be thicker than the welding portion, it is possible to suppress electric resistance between the welding portion and the connecting portion, which is produced when current is caused to flow in the conductive portion, i.e., electric resistance of the conductive portion.

The power supply apparatus according to the present invention comprises a battery, a circuit wiring board for controlling charge and/or discharge operation of the battery, and a lead terminal or terminals for electrically connecting the battery and the circuit wiring board, the lead terminal being a plate material consisting of conductive metal, the lead terminal including a welding portion in which electricity is caused to flow in the state caused to be in contact with the external terminal of the battery so that the welding portion is resistance-welded to an external terminal of the battery, a connecting portion connected to the external terminal of the circuit wiring board, and a conductive portion positioned between the welding portion and the connecting portion and serving to allow the welding portion and the connecting portion to electrically conduct, wherein the lead terminal is formed so that the thickness of the welding portion is thinner than the thickness of the conductive portion.

In this power supply apparatus, since the welding portion of the lead terminal is thinner than the conductive portion, it is possible to allow large part of current flowing in the welding portion of the lead terminal in performing resistance-welding of the external terminal of the battery and the welding portion of the lead terminal to flow in a thickness direction of the lead terminal.

In the power supply apparatus according to the present invention, current for resistance-welding flows to much degree in a thickness direction of the lead terminal so that electric resistance of the welding portion is increased. As a result, calorific value produced at the contact portion between the external terminal of the battery and the welding portion of the lead terminal also becomes large. Thus, it is possible to suitably resistance-weld the welding portion of the lead terminal to the external terminal of the battery with high welding strength.

In this power supply apparatus, since the conductive portion at the lead terminal is thicker than the welding portion, it is possible to suppress electric resistance between the welding portion and the connecting portion, which is produced when electricity for charging/discharging the battery is caused to flow in the lead terminal, i.e., electric resistance of the conductive portion. Accordingly, electric resistance of the conductive portion at the lead terminal is suppressed, thereby making it possible to suppress heat of the lead terminal by electric resistance when electricity is caused to flow in the lead terminal.

In addition, in the power supply apparatus according to the present invention, electric resistance of the lead terminal is suppressed so that voltage drop and power loss at the time of charge/discharge operation can be reduced. Thus, the charge/discharge efficiency is permitted to be satisfactory.

Still further objects of the present invention and practical merits obtained by the present invention will become more apparent from the embodiments which will be given below with reference to the attached drawings.

BEST MODE FOR CARRYING OUT THE INVENTION

Figure 1:
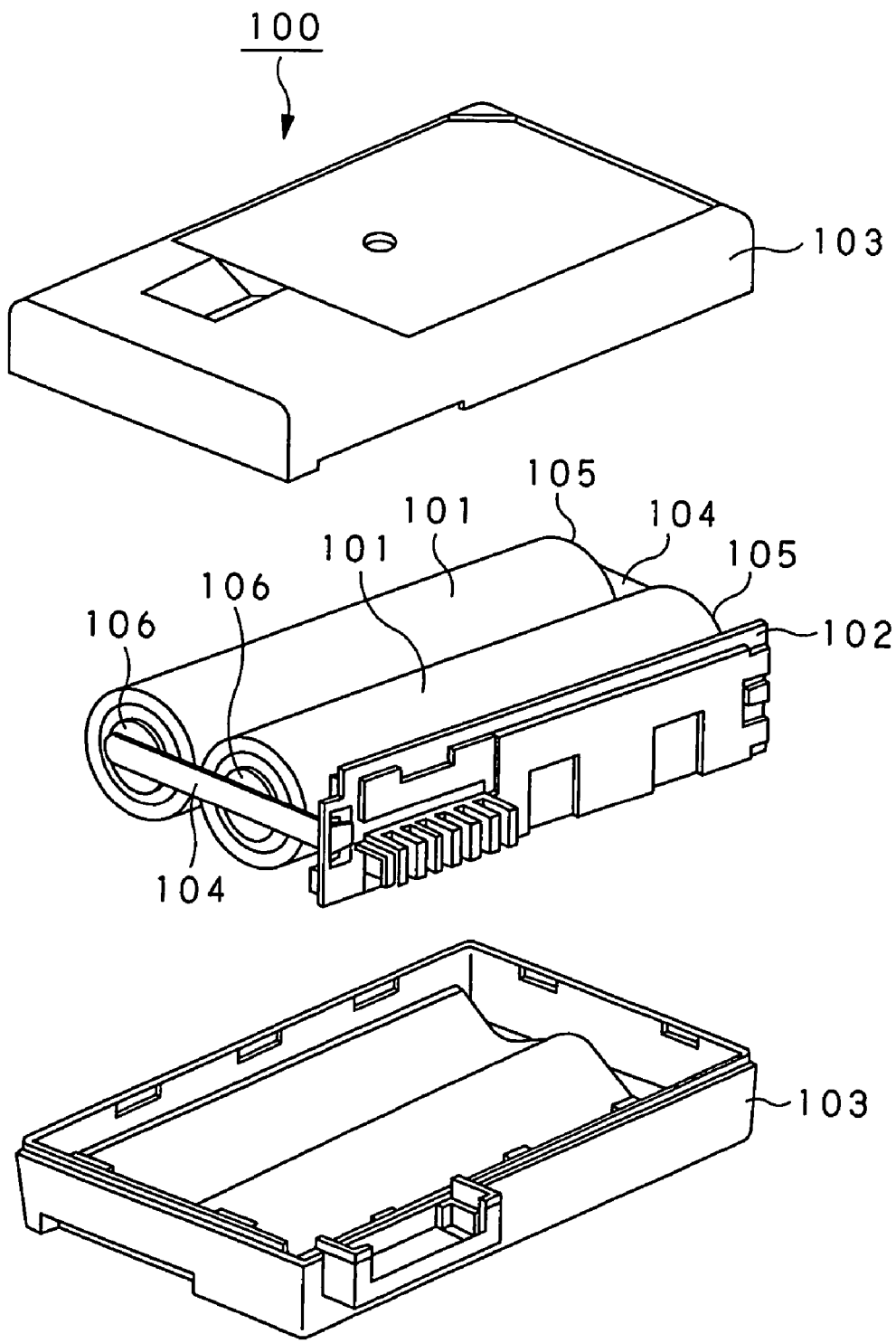
FIG. 1 is an exploded perspective view showing a conventional battery pack.
Figure 2:
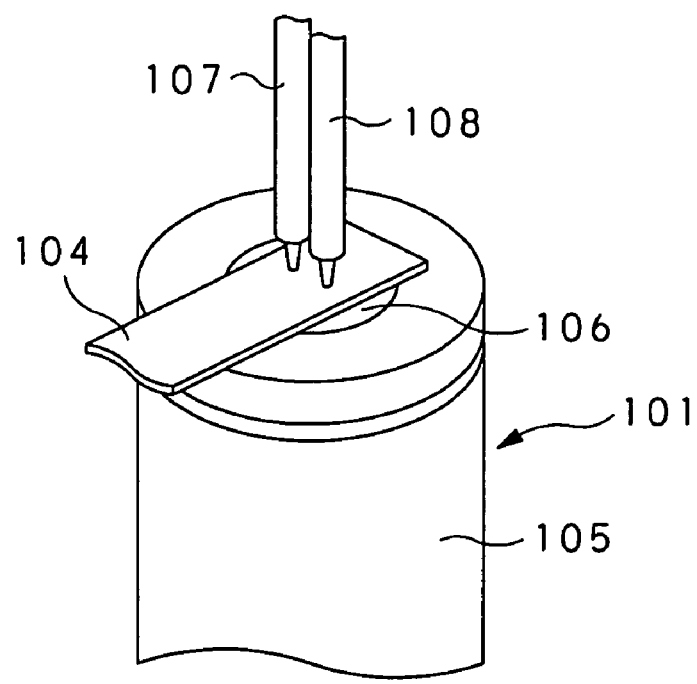
FIG. 2 is a perspective view showing the state where lead terminal is welded to lithium ion secondary battery constituting the battery pack.
Figure 3:
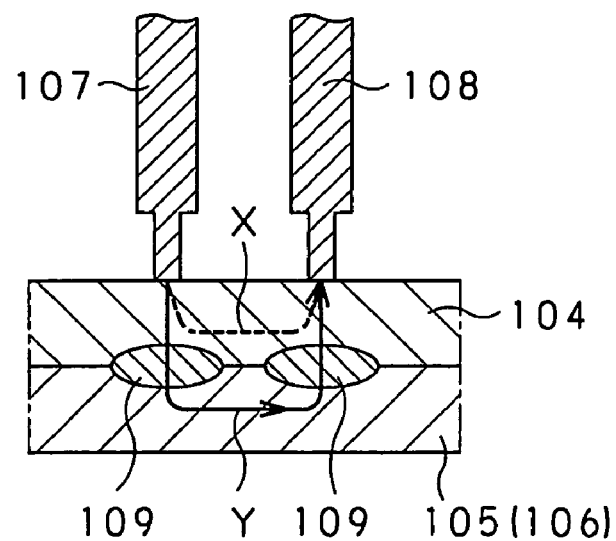
FIG. 3 is an essential part cross sectional view showing, in a model form, the state where current for performing resistance welding flows in lead terminal provided at the battery pack.
Figure 4:
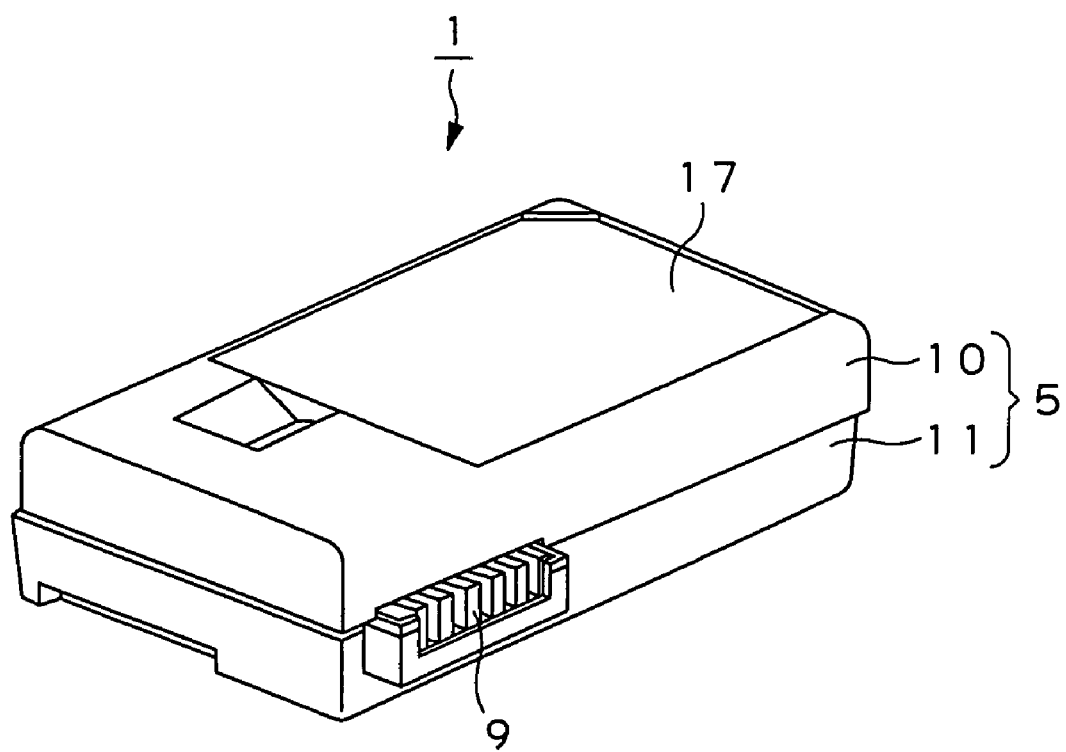
FIG. 4 is a perspective view showing battery pack using lead terminal according to the present invention.

A lead terminal and a power supply apparatus using such a lead terminal according to the present invention will now be explained with reference to a battery pack 1 shown in FIGS. 4 and 5. The battery pack 1 is loaded with respect to a loading portion provided at electronic equipment, etc., e.g., camera integrated type VTR, etc. to have ability to stably deliver power of a predetermined voltage to the electronic equipment, etc.

Further, the battery pack 1 includes a pair of substantially cylindrical batteries 2a, 2b which serve as power generating element, lead terminals 3 connected to external terminals of the pair of batteries 2a, 2b, and a circuit wiring board 4 electrically connected to the pair of batteries 2a, 2b through the lead terminals 3 to thereby perform control of charge/discharge operation with respect to the pair of batteries 2a, 2b, wherein the pair of batteries 2a, 2b, the lead terminals 3 and the circuit wiring board 4 are accommodated within a substantially box-shaped accommodating case 5.

The battery pack 1 is accommodated in the state where a battery module 6 in which the pair of batteries 2a, 2b are connected in parallel by the lead terminals 3 so that they are integrated is connected to the circuit wiring board 4 through the lead terminals 3. It is to be noted that while the battery module 6 in which the pair of batteries 2a, 2b are connected in parallel will be explained here, the present invention is not limited to such an implementation, but, e.g., battery module in which a pair of batteries 2a, 2b are connected in series may be employed, and the number of batteries and/or arrangement thereof, etc. may be arbitrarily selected.

In the following explanation, in the case where either one of batteries 2a, 2b is indicated, such battery is simply labeled as battery 2.

Figure 6:
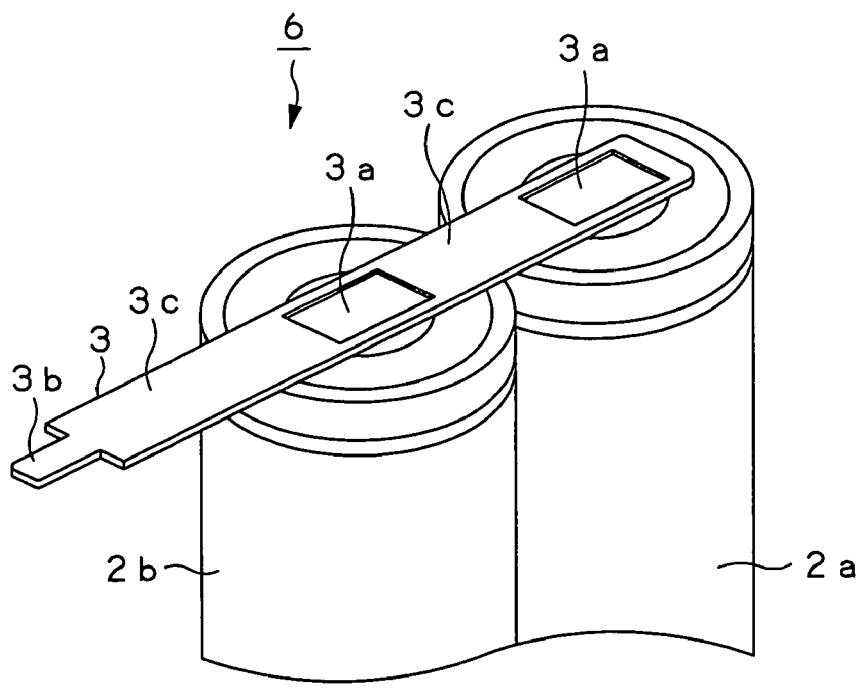
FIG. 6 is a perspective view showing battery module constituting the battery pack.

As shown in FIG. 6, lead terminal 3 constituting the battery module 6 is a plate material consisting of conductive metal, and includes plural welding portions 3a connected to both end surfaces serving as external terminals of the pair of batteries 2a, 2b, connecting portions 3b connected to connecting lands 7, etc. of the circuit wiring board 4, and conductive portions 3c disposed between these welding portions 3a and between the welding portion 3a and the connecting portion 3b and serving to allow these components to electrically conduct.

The lead terminal 3 is formed by conductive metal such as alloy containing any one kind or plural kinds of e.g., nickel, nickel alloy, iron, iron alloy, stainless steel, zinc, zinc alloy, copper, copper alloy, sliver, silver alloy, gold, gold alloy, platinum, platinum alloy, aluminum, aluminum alloy, molybdenum, molybdenum alloy, tungsten, tungsten alloy, titanium, titanium alloy, beryllium, beryllium alloy, rhodium, and rhodium alloy.

The lead terminals 3 are adapted so that welding portions 3a are respectively welded to the same poles positioned on both end surfaces of the pair of batteries 2a, 2b to thereby integrate the pair of batteries 2a, 2b to constitute the battery module 6. In concrete terms, respective one end surfaces of the pair of batteries 2a, 2b are connected in parallel by means of one lead terminal 3 by resistance-welding, and respective other end surfaces of the pair of batteries 2a, 2b are connected in parallel by means of one lead terminal 3 by resistance-welding to thereby constitute the battery module 6. In this example, in the battery module 6, since end surfaces of the pair of batteries 2 and welding portions 3a are resistance-welded by the resistance welding method, it is possible to prevent battery deterioration taking place as the result of the fact that, e.g., in the case where welding is performed by ultrasonic welding, etc., ultrasonic wave is transmitted to the battery. Thus, it is possible to suppress manufacturing cost as compared to laser welding, etc. in which the apparatus therefor is expensive.

In the battery module 6 constituted in this way, since lead terminals 3 are respectively welded to both end surfaces of the pair of batteries 2a, 2b, the pair of batteries 2a, 2b in which rotation in outer circumferential direction of the battery 2 has been prevented are fixed in the state where they are adjacent to each other. Moreover, the lead terminals 3 are adapted so that connecting portions 3b are welded to connecting lands 7, etc. of the circuit wiring board 4 by, e.g., soldering, etc. to electrically connect the circuit wiring board 4 and the pair of batteries 2a, 2b.

In the lead terminal 3, the thickness of substantially rectangular welding portion 3a is caused to be thinner than the thickness of the conductive portion 2c. In concrete terms, the thickness of the welding portion 3a is thinned down to about 0.15 mm with respect to the conductive portion 3c having thickness of about 0.3 mm.

For this reason, in the lead terminal 3, since welding portions 3a respectively welded to both end surfaces serving as external terminals of the pair of batteries 2a, 2b by the resistance-welding method, etc. are thinner than those of the conductive portions 3c, large part of current for welding flowing in the welding portion 3a in welding the end surfaces of the battery 2 and the welding portion 3a is permitted to flow in a thickness direction of the welding portion 3a.

Accordingly, in the lead terminal 3, current for welding flows in the thickness direction of the welding portion 3a to much degree so that electric resistance of the welding portion 3a is increased. As a result, calorific value produced between the end surface of the battery 2 and the welding portion 3a also becomes large. Thus, the welding portion 3a is welded to the end surface of the battery 2 with high welding strength.

In this example, in the lead terminal 3, etching processing, etc. is implemented in the state where portions except for the portion where the welding portion 3a is provided is masked so that welding portion 3a having thin thickness is provided. In the lead terminal 3, the time required for immersing it into etchant, etc. is controlled, thereby permitting the welding portion 3a to have a predetermined thickness. In the lead terminal 3, there may be provided welding portion 3a of which thickness has been thinned by method, e.g., laser processing, and/or drawing processing, etc. in addition to etching processing, etc.

Figure 7:
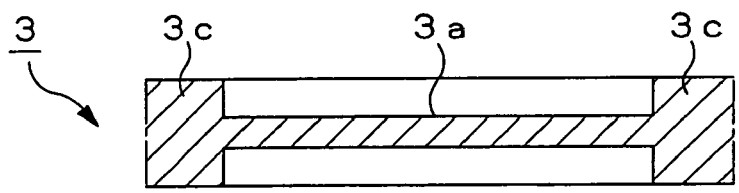
FIG. 7 is an essential part cross sectional view showing an example of lead terminal provided at the battery pack.
Figure 8:
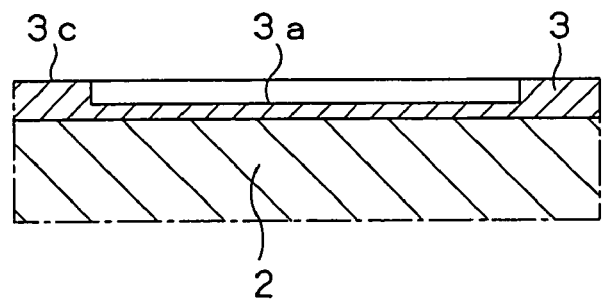
FIG. 8 is an essential part cross sectional view showing connecting portion between lead terminal and battery.

In the lead terminal 3, while the welding portion 3a may be constituted by recessed portions provided at positions opposite to each other at both principal surfaces of plate material consisting of conductive metal as shown in FIG. 7, one principal surface of the welding portion 3a is caused to be flat plane surface having no offset as shown in FIG. 8, for example, to perform welding in such a manner to opposite the flat surface to both end surfaces of the battery 2, thereby making it possible to suitably resistance-weld the welding portion 3a to the end surface of the battery 2 without producing gap between the welding portion 3a and the battery 2.

In the lead terminal 3, since the conductive portion 3c for electrically conducting the welding portion 3a welded to the battery 2 and the connecting portion 3b connected to the circuit wiring board 4 is caused to be thicker than the welding portion 3a, whereby when current for changing/discharging the battery 2 is caused to flow, electric resistance produced between the welding portion 3a and the connecting portion 3b, i.e., electric resistance of the conductive portion 3c is suppressed. Accordingly, in the lead terminal 3, since electric resistance of the conductive portion 3c is suppressed, even in the case where large current of the order of 1 C to 2 C is caused to flow by, e.g., requirement of electronic equipment, etc., calorific value by electric resistance can be reduced. In this case, in the lead terminal 3, e.g., thickness of the conductive portion 3c is permitted to be thick so that its thickness is equal to about 1 mm to 2 mm.

At the circuit wiring board 4 to which the battery module 6 is connected through the lead terminals 3, pattern wiring (not shown) having connecting land 7 consisting of conductive metal, etc. and adapted so that lead terminal 3 is connected by soldering, etc. electronic circuit components (parts) such as IC (Integrated Circuit) chip and/or LSI (Large-Scale Integrated circuit) chip, etc. (not shown) connected to the pattern wiring and serving to perform charge/discharge control, and/or over-discharge and/or over-charge protection, etc., with respect to the battery module 6 and/or protection element components (parts) such as temperature fuse, etc. are provided on a board 8.

Moreover, at the circuit wiring board 4, a connector 9 electrically connected to the pattern wiring, etc. by, e.g., soldering, etc. is attached to the other principal surface of the side opposite to one principal surface where electronic circuits, etc. are attached. When the power supply pack 1 is connected to electronic equipments, etc., the connector 9 is engaged with external terminal, etc. provided at electronic equipment, etc. so that it is electrically connected thereto to thereby function as a supply port for supplying electricity to electronic equipment, etc. When the battery module 6 is charged, the connector 9 also functions as a connecting portion to which, e.g., AC power supply, etc. is connected. The circuit wiring board 4 is accommodated within an accommodating case 5 in a manner along the side wall of the accommodating case 5 in the state where, e.g., the side wall of substantially boxed-shaped accommodating case 5 and the other principal surface of the board 8 are opposite to each other.

The accommodating case 5 within which the battery module 6 and the circuit wiring board 4 are accommodated consists of insulating resin, etc., e.g., polycarbonate or ABS (Acrylonitrile Butadiene Styrene) resin, etc., and is composed of an upper case 10 and a lower case 11. The upper case 10 and the lower case 11 respectively have shapes in which side wall is provided in a projected manner along the outer circumferential edge portion of substantially rectangular principal surface, and is constituted as substantially box-shaped accommodating case 5 by butting respective side walls with each other.

At the accommodating case 5, an opening portion for allowing the connector 9 attached to the circuit wiring board 4 to be exposed toward the external is formed by cut portions 12 formed at the side walls of the upper case 10 and the lower case 11, and an engagement recessed portion 13 with which the connector 9 is engaged.

At the lower case 11 of the accommodating case 5, there is provided a battery partition wall 14 for partitioning the surface of the side where the battery module 6 is accommodated into two parts. Further, at the accommodating case 5, a pair of batteries 2a, 2b within the battery module 6 are respectively accommodated into two spaces partitioned by the battery partition wall 14. Thus, the battery partition wall 14 is caused to intervene therebetween so that it can be prevented that the batteries 2a, 2b collide with each other therewithin.

At the lower case 11 of the accommodating case 5, plural holding pieces 15 in which the battery holding pieces are caused to come into contact with the outer circumferential surface of the battery 2 to thereby hold the battery module 6 are provided at the face of the side where the battery module 6 is accommodated in addition to the above-described battery partition walls 14. At the lower case 11, plural battery holding pieces 15 are provided at the entirety of two spaces partitioned by the battery partition wall 14, and are adapted so that contact surfaces 15a having curve along the outer circumferential surface of the battery 2 of the battery holding pieces 15 come into contact with the outer circumferential surface of the battery 2 to thereby suitably hold the battery module 6. It is to be noted, in the accommodating case 5, the battery module 6 may be adhered (bonded) to the inner wall by adhesive member, e.g., adhesive agent, etc. to thereby firmly fix the battery module 6.

Thus, in the power supply pack 1, it becomes possible to accommodate the battery module 6 thereinto without shaking by the battery partition wall 14 and the battery holding pieces 15 provided within the accommodating case 5.

In the case where the power supply pack 1 undergoes impact from the external, e.g., the power supply pack 1 is erroneously fallen down, since the battery partition wall 14 caused to intervene between a pair of batteries 2a, 2b at the battery module 6 function as buffer material, it is possible to suppress shape deformation of the battery 2 and/or battery characteristic deterioration, etc. which take place as the result of the fact that the batteries 2a, 2b collide with each other. In addition, the battery partition wall 14 and/or the battery holding piece 15 function in a manner to enhance rigidity of the accommodating case 5.

Within the power supply pack 1 of such a configuration, there is also accommodated, e.g., an insulator 16 for insulation, etc. for preventing contact between the battery module 6 and the circuit wiring board 4 in addition to the above-described battery module 6 and the circuit wiring board 4, etc.

The insulator 16 consists of sheet-shaped insulating material, etc., e.g., polyethylene, polypropylene or imcombustible (non-combustible) paper, etc., and is disposed between the battery module 6 and the circuit wiring board 4. Thus, when, e.g., the power supply pack 1 undergoes impact from the external, the insulator 16 prevents the battery module 6 from coming into with the circuit wiring board 4. From this fact, it is possible to prevent external short, etc. of the battery 2, which takes place as the result of the fact that the battery module 6 comes into contact with the circuit wiring board 4.

In addition, at the power supply pack 1, there is attached, at the outer circumference of the accommodating case 5, a label 17 in which, e.g., manufacturing lot number, etc. is indicated to thereby permit source of the source battery module 6 and/or the circuit wiring board 4, etc. to become apparent.

Figure 9:
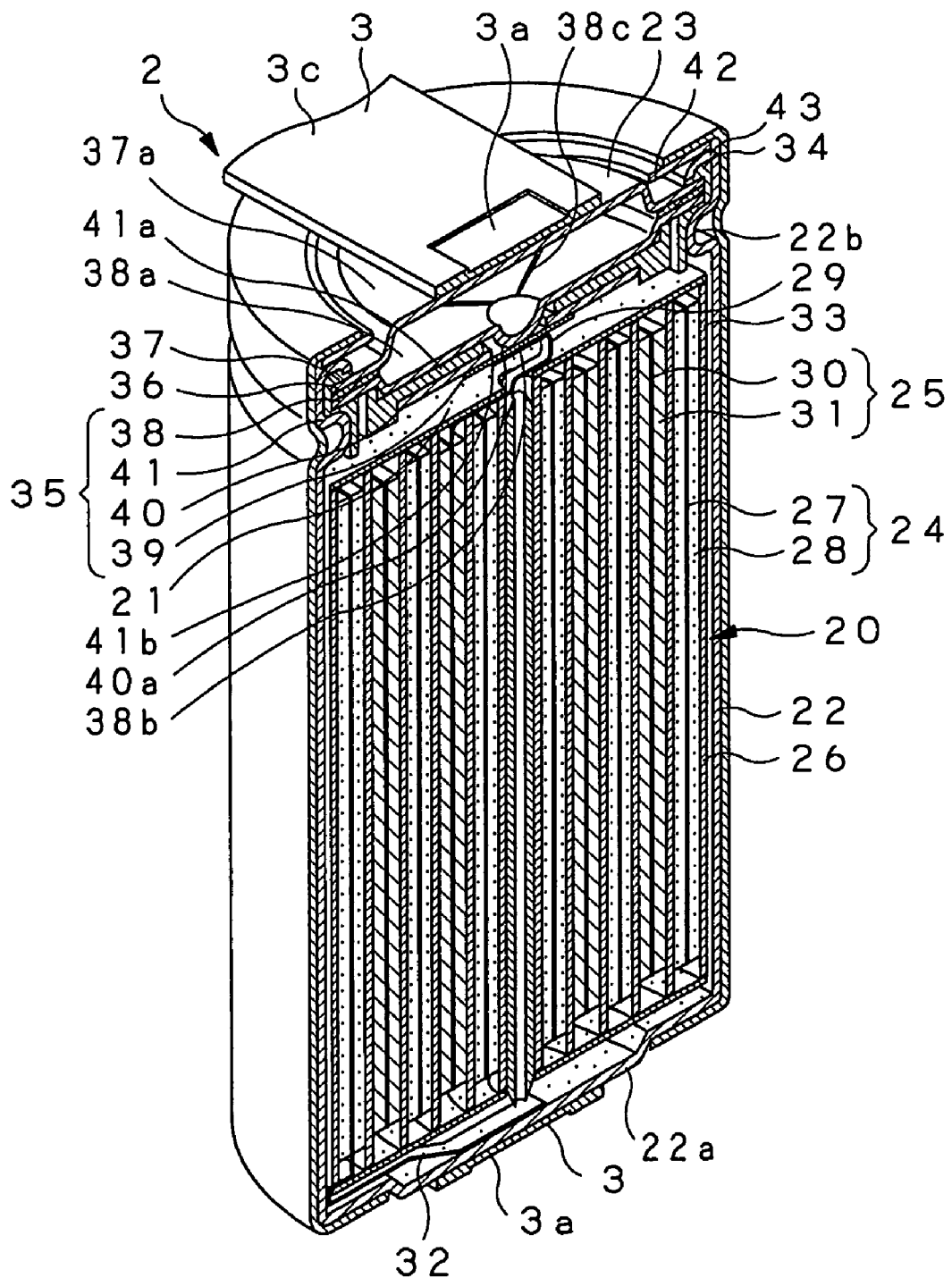
FIG. 9 is a perspective view showing internal structure of the battery constituting battery pack.

Then, the battery 2 accommodated into the power supply pack 1 constituted as described above will be explained. The battery 2 includes, as shown in FIG. 9, a battery element 20 for generating electricity, an electrolytic solution 21 for moving ions within the battery element 20, an armored can 22 for accommodating the battery element 20 and the electrolytic solution 21, and a cover body 23 for closing the opening portion of the armored can 22.

The battery element 20 is caused to be of the configuration in which a belt-shaped cathode 24 using lithium transition metal compound oxide, etc. as active cathode material and a belt-shaped anode 25 using carbonaceous material, etc. as active anode material are laminated through a belt-shaped separator 26 for shielding the cathode and the anode with each other so that they are not in contact with each other, and are wound in length direction. The battery 2 in which such battery element 20 serves as power generating element is so-called lithium ion secondary buttery in which lithium ions are caused to be transferred between the cathode 24 and the anode 25 so that battery reaction is performed.

The cathode 24 is caused to be of the structure in which cathode compounding agent coating liquid containing active cathode material and binding agent is coated, dried and pressurized with respect to the principal surface of a cathode collector 27 so that a cathode compounding agent layer 28 is compressed and formed on the principal surface of the cathode collector 27. A cathode terminal 29 of the cathode 24 is electrically connected to a predetermined position of the cathode collector 27. As the cathode terminal 29, there is used belt-shaped metallic piece, etc. consisting of conductive metal, e.g., aluminum, etc.

At the cathode 24, as active cathode material contained in the cathode compounding agent layer 28, there is used material capable of doping/undoping lithium ion. In concrete terms, there may be used, e.g., lithium transition metal compound oxide indicated by chemical expression $Li_xMO_2$ (valence x of Li is within the range from 0.5 to 1.1, and M is any kind one or plural kinds of compounds among transition metals), etc., metal sulphide or metal oxide which does not contain lithium such as $TiS_2$, $MoS_2$, $NbSe_2$, $V_2O_5$, etc., or specific polymer, etc. Among these materials, as lithium transition metal compound oxide, there are mentioned, e.g., lithium-cobalt compound oxide ($LiCoO_2$), lithium-nickel compound oxide ($LiNiO_2$), $Li_xNi_yCO_{1-y}O_2$ (valence x of lithium and valence y of nickel vary depending upon charge/discharge state of the battery, and 1−y is valence of cobalt and these valences are respectively ordinarily expressed as o<x<1, 0.7<y<1.02), and/or spinel type lithium manganese compound oxide expressed as $LiMn_2O_4$, etc. Further, at the cathode 2, as active cathode material, there may be used any one kind of metal sulfide, metal oxide and lithium compound oxide, etc. which have been described above, or mixture in which plural materials thereof are mixed.

At the cathode 24, as binding agent of the cathode compounding agent layer 28, carbonaceous material, etc. may be added, or well known additive agent, etc. may be added as conductive material into the anode compounding agent layer 28 in addition to the fact that there may be used resin material, etc., e.g., polyvinyl fluoride, polyvinylidene fluoride, polytetrafluoroethylene, etc. which are used as cathode compounding agent of non-aqueous electrolyte battery. In addition, at the cathode 24, foil-shaped metal or mesh-shaped metal, etc. consisting of conductive metal, e.g., aluminum, etc. may be used as the cathode collector 27.

The anode 25 is caused to be of the structure in which anode compounding agent liquid containing active anode material and binding agent is coated, dried and pressurized with respect to the principal surface of an anode collector 30 so that an anode compounding agent layer 31 is compressed and formed on an anode collector 30. At the anode 25, an anode terminal 32 is connected to a predetermined position of the anode collector 30. As the anode terminal 32, there may be used belt-shaped metallic piece, etc. consisting of conductive metal, e.g., copper or nickel, etc.

At the anode 25, as active anode material contained (included) in the anode compounding agent layer 31, there may be used lithium, lithium alloy or carbonaceous material capable of doping/undoping lithium ion, etc. As carbonaceous material capable of doping/undoping lithium ion, there may be used, e.g., low crystallinity (crystalline characteristic)carbon material obtained by sintering at a relatively low temperature less than 2000° C., and/or high crystallinity carbon material, etc. such as artificial graphite obtained by firing (baking) material apt to be crystallized at a high temperature in the vicinity of 3000° C. In concrete terms, there may be used thermal decomposition carbon or the like, cokes or the like, graphite or the like, glass-shaped carbon fiber, organic high molecular compound fired (baked) body, carbon fiber and/or carbonaceous material such as activated carbon, etc. As the cokes or the like, there are, e.g., pitch cokes, needle cokes and/or petroleum cokes, etc. In this case, the organic high molecular compound fired (baked) body is material obtained by firing (baking) phenol resin or furan resin, etc. at a suitable temperature to carbonize such resin. These carbonaceous materials makes it possible to suppress that lithium is precipitated toward the anode 25 side in charging/discharging the battery 2.

In addition to the above-described carbonaceous material, as active anode material, there are mentioned, e.g., metal, alloy and element which can compound with lithium, and compounds thereof, etc. As active anode material, when, e.g., element which can compound with lithium is expressed as M, there are compounds expressed by the chemical expression of $M_xM'_yLi_z$ (M' is metal element except for Li element and M element, valence x of M is numeric value larger than zero (0), and valence y and valence z of Li of M' are numeric value equal to 0 (zero) or more). In this chemical expression, e.g., B, Si, As, etc. which are semiconductor element are mentioned as metal element. In concrete terms, there are mentioned, e.g., elements such as Mg, B, Al Ga, In, Si, Ge, Sn Pb, Sb, Bi, Cd, Ag, Zn, Hf, Zr, Y, B, Si, As, etc. and compounds containing these elements, Li—Al, Li—Al-M (M is either one or plural kinds of transition metal elements of 2A group, 3B group and 4B group), AlSb, and CuMgSb, etc.

Particularly, as element which can compound with lithium, it is preferable to use 3B typical elements. Among these elements, it is preferable to use Si or Sn. Further, it is preferable to use Si. In concrete terms, as Si compound and Sn compound indicated by the chemical expression $M_xSi$, $M_xSn$ (M is one kind of elements or more except for Si, Sn, and valence x of M is numeric value of 0 (zero) or more), there are mentioned, e.g., $SiB_4$, $SiB_6$, $Mg_2Si$, $Mg_2Sn$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, and $ZnSi_2$, etc. One kind of these compounds, or mixture obtained by mixing plural kinds of compounds may be used.

Further, as active anode material, element compounds of 4B group except for carbon containing one non-metal element or more may be also utilized. In such compound, plural kinds of elements of 4B group may be contained (included). In concrete terms, there are mentioned, e.g., SiC, $Si_3N_4$, $Si_2N_2O$, $Ge_2N_2O$, $SiO_x$ (valence x of oxygen is within the range of $0<x\leq2$), $SnO_x$ (valence x of oxygen is within the range of $0<x\leq2$), LiSiO, and LiSnO, etc. Any one kind of these compounds, or mixture obtained by mixing plural kinds thereof may be used.

At the anode 25, as binding agent of the anode compounding agent layer 31, there may be used resin material, etc., e.g., polyvinylidene fluoride or polytetrafluoroetylene, etc. used as anode compounding agent of the non-aqueous electrolyte battery. At the anode 25, as the anode collector 30, there may be used, e.g., foil-shaped metal or mesh-shaped metal, etc. consisting of conductive metal, etc. such as copper, etc.

A separator 26 serves to separate the cathode 24 and the anode 25. There may be used well known material ordinarily used as insulating micro porous film of the non-aqueous electrolyte battery of this kind. In concrete terms, there may be used high molecular film, e.g., polypropylene or polyethylene, etc. In addition, from the relationship between lithium ionic conductivity and energy density, it is preferable that the thickness of the separator 26 is as thin as possible. The separator 26 of which thickness is caused to be 30 µm or less is used.

The battery element 20 of such a configuration is a winding body in which the cathode 24 and the anode 25 are laminated through the separator 26 and are wound in a length direction, and is caused to be of the structure in which a cathode terminal 29 is extended (projected) from one end surface of the winding axial direction, and an anode terminal 32 is extended (projected) from the other end surface thereof.

The electrolytic solution 21 is a non-aqueous electrolytic solution in which electrolytic salt is dissolved into, e.g., non-aqueous solvent. In the electrolytic solution 21, as non-aqueous solvent, there may be used, e.g., ring-shaped carbonic ester compound, and/or cyclic carbonic ester compound or chain carbonic ester compound, etc. in which halogen radical or acrylic halide radical is substituted for hydrogen. In concrete terms, there are mentioned propylene carbonate, ethylene carbonate, diethyl carbonate, dimethyl carbonate, 1,2-dimethoxy ethane, 1, 2-diethoxy ethane, γ-butyrolactone, tetrahydrofuran, 2-methyltetrahydrofuran, 1, 3-dioxolan, 4 methy 1, 3 dioxolan, diethyl ether, sulfolane, methylsulfolane, acetonitrile, propionitrile, anisole, acetic ester, butyric ester, and propionic acid ester, etc. One kind of these compounds may be used thereamong. Particularly, from a viewpoint of voltage stability, it is preferable to use, as non-aqueous solvent, propylene carbonate, dimethy carbonate and/or diethyl carbonate.

Moreover, as electrolytic salt, there are mentioned, e.g., $LiPF_6$, $LiClO_4$, $LiAsF_6$, $LiBF_4$, $LiB(C_6H_5)_4$, $LiCH_3SO_3$, $LiCF_3SO_3$, LiCl, and LiBr, etc. Any one kind of these materials or more may be used.

The armored can 22 is a cylindrical vessel having bottom portion consisting of conductive metal, etc., e.g., iron, aluminum or stainless steel, etc., wherein a can bottom portion 22a has shape such as circle. As the armored can 22, there may be used a cylindrical vessel having bottom portion, which includes the can bottom portion 22a having, e.g., rectangular shape or oblate shape, etc.

The battery element 20 in which insulators 33 for preventing internal short are disposed at both end surfaces is inserted into the armored can 22, and an anode terminal 32 projected from the other end surface of the battery element 20 is electrically connected to the can bottom portion 22a by soldering, etc. so that the armored can 22 is caused to serve as external anode terminal of the battery 2. In this example, in the battery 2, the welding portion 3a of the lead terminal 3 is welded to the can bottom portion 22a of the armored can 22 serving as one end surface by the resistance-welding method.

At the armored can 22, a bead portion 22b constricted toward the inside over the inner diameter entire circumference is provided in the vicinity of the opening portion thereof. When the cover body 23 is press-fitted into the opening portion of the armored can 22 through gasket 34 to close the cover, the bead portion 22b is caused to serve as pedestal of the cover body 23 to determine the position where the cover body 23 is disposed at the opening portion of the armored can 22, and to prevent the battery element 20 accommodated within the armored can 22 from jumping out therefrom.

The armored can 22 is adapted so that the portion in the vicinity of upper edge portion relative to the bead portion 22b is caused to undergo bending processing, so-called caulking processing in the state where the battery element 20 is accommodated so that the cover body 23 is press-fitted into the opening portion through the gasket 34, whereby the cover body 23 is firmly fixed to the opening portion to hermetically seal the battery element 20 thereinto. Moreover, at the armored can 22, when caulking processing is implemented, the gasket 34 is protruded or projected at the entire circumference of the edge portion of the opening portion so that the edge portion and the cover body 23 are not caused to be in contact with each other.

The cover body 23 is press-fitted into the opening portion of the armored can 22 in the state where a current interruption mechanism portion 35 for interrupting current flowing in the battery 2 when battery internal pressure of the battery 2 becomes equal to a predetermined pressure or more, a PTC (Positive Temperature Coefficient) element 36 for increasing electric resistance when current of a predetermined temperature or more, or a predetermined current value or more flows in the battery 2 to lessen current flowing in the battery 2, and a terminal plate 37 serving as external cathode terminal of the battery 2 are laminated in succession, and are accommodated within the gasket 34.

The current interruption mechanism portion 35 is composed of a safety valve 38 which is broken in the case where the battery internal pressure rises up to a predetermined value or more to escape air, etc. within the battery toward the outside of the battery, a connecting plate 39 to which the cathode terminal 29 is connected, a disc 40 to which the connecting plate 39 is connected, and a disc holder 41 for insulating the safety valve 38 and the disc 40.

The safety valve 38 consists of conductive metal, etc., e.g., aluminum, etc., wherein press processing, etc. is implemented to the disc-shaped metal plate so that there are formed a dish portion 38a projected toward the battery element 20 side accommodated within the armored can 22 and a projection portion 38b projected from substantially the center of the dish portion 38a toward the battery element 20 side. Moreover, at the safety valve 38, a thin thickness portion 38c which is broken when the battery internal pressure becomes equal to a predetermined value or more is provided at the dish portion 38a.

The connecting plate 39 consists of conductive metal, etc., e.g., aluminum, etc., wherein the projection portion 38b of the safety valve 38 is welded to one principal surface thereof and cathode terminal 29 from which the battery element 20 is projected is welded to the other principal surface by ultrasonic welding, etc. so that the connecting plate 39 is connected.

The disc 40 consists of metal plate, etc. having, e.g., such a certain rigidity to have ability to plane characteristic, and is provided substantially at the central portion thereof with a hole portion 40a into which projection portion 38b of the safety valve 38 is inserted.

The disc holder 41 consists of, e.g., insulating resin material, etc., and exhibits annular shape so that the dish portion 38a of the safety valve 38 and the disc 40 are fitted with respect to the inner circumferential side to thereby hold the dish portion 38a and the disc 40. Moreover, at the disc holder 41, a separation portion 41a for separating the dish portion 38a of the safety valve 38 and the disc 40 which have been fitted so that they are not in contact with each other is provided in a manner to project toward the inside over the entire inner circumference. Further, at the disc holder 41, a hole portion 41b into which the projection portion 38b of the safety valve 38 is inserted is provided substantially at the central portion of the separation portion 41a.

Further, the current interruption mechanism portion 35 is caused to be of the configuration in which the dish portion 38a of the safety valve 38 and the disc 40 are fitted with respect to the inner circumferential side of the disc holder 41 so that they are not caused to be in contact with each other by the separation portion 41a, and the projection portion 38b of the safety valve 38 is inserted into a hole portion 41b of the disc holder 41 and a hole portion 40a of the disc 40 so that it is welded to the connecting plate 39 by, e.g., resistance welding method or ultra-sonic welding method, etc. Namely, the current interruption mechanism portion 35 is adapted so that the connecting plate 39, the disc 40, the disc holder 41 and the safety valve 38 are laminated in succession, and the projection portion of the safety valve 38 is connected to the connecting plate 39 in a manner to penetrate the disc holder 41 and the disc 40.

At the current interruption mechanism portion 35 of such a configuration, in accordance with elevation of the battery internal pressure, the dish portion 38a of the safety valve 38 is deformed in a manner to swell toward the outside opposite to the battery element 20 side. Further, since the disc 40 suppresses that the current interruption mechanism portion 35 attempts to move toward the outside of the connecting plate 39 connected to the projection portion 38b followed by deformation of the dish portion 38a of the safety valve 38, connection between the projection portion 38b of the safety valve 38 and the connecting plate 39 is interrupted. In a manner as stated above, at the current interruption mechanism portion 35, when battery internal pressure rises, connection between the battery element 20 and the cover body 23 is interrupted to suppress that a current flows no longer so that battery internal pressure is further elevated.

When the battery temperatures rises to a predetermined value or more, or current of a predetermined value or more is caused to flow so that temperature rises, the PTC element 36 enlarges its electric resistance to reduce current flowing in the battery 2. Thus, at the battery 2, the PTC element 36 controls current value, thus making it possible to suppress temperature elevation of the battery inside. Moreover, when its electric resistance becomes large so that current flowing in the battery 2 becomes small and temperature is thus lowered, the electric resistance of the PTC element 36 becomes small so that current is caused to flow in the battery 2 for a second time.

The terminal plate 37 consists of conductive metal, etc. containing any one kind of, e.g., iron, aluminum, stainless steel, nickel, zinc and zinc alloy, etc., or plural kinds thereof, and is electrically connected to the cathode terminal 29 projected from the battery element 20 through the connecting plate 39, the safety value 38 and the PTC element 36 so that the terminal plate 37 functions as cathode external terminal of the battery 2.

In the terminal plate 37, e.g., press processing, etc. is implemented to disc-shaped metal plate so that a terminal portion 37a projected toward the side opposite to the battery element 20 accommodated within the armored can 22 is provided. The terminal portion 37a serves as a connecting portion of the cathode side with respect to the external side of the terminal plate 37 serving as the cathode external terminal, and connection terminal from the external is connected thereto by, e.g., contact and/welding, etc. In this example, in the battery 2, the welding portion 3a of the lead terminal 3 is welded to the terminal portion 37a of the terminal plate 37 serving as the other end surface by the resistance-welding method.

Moreover, at the terminal plate 37, there is provided gas escape hole, etc. (not shown) for escaping gas, etc. discharged toward the external as the result of the fact that the safety valve 38 is broken by, e.g., elevation of the battery internal pressure.

Then, a method of assembling the battery pack 1 in which the battery 2 of the configuration as stated above is accommodated will be explained. First, a method of welding the lead terminals 3 to the battery 2 will be explained. It is to be noted that explanation will be given here by taking the example of the case where the lead terminal 3 is connected to the welding portion 37a of the cover body 23.

Figure 10:
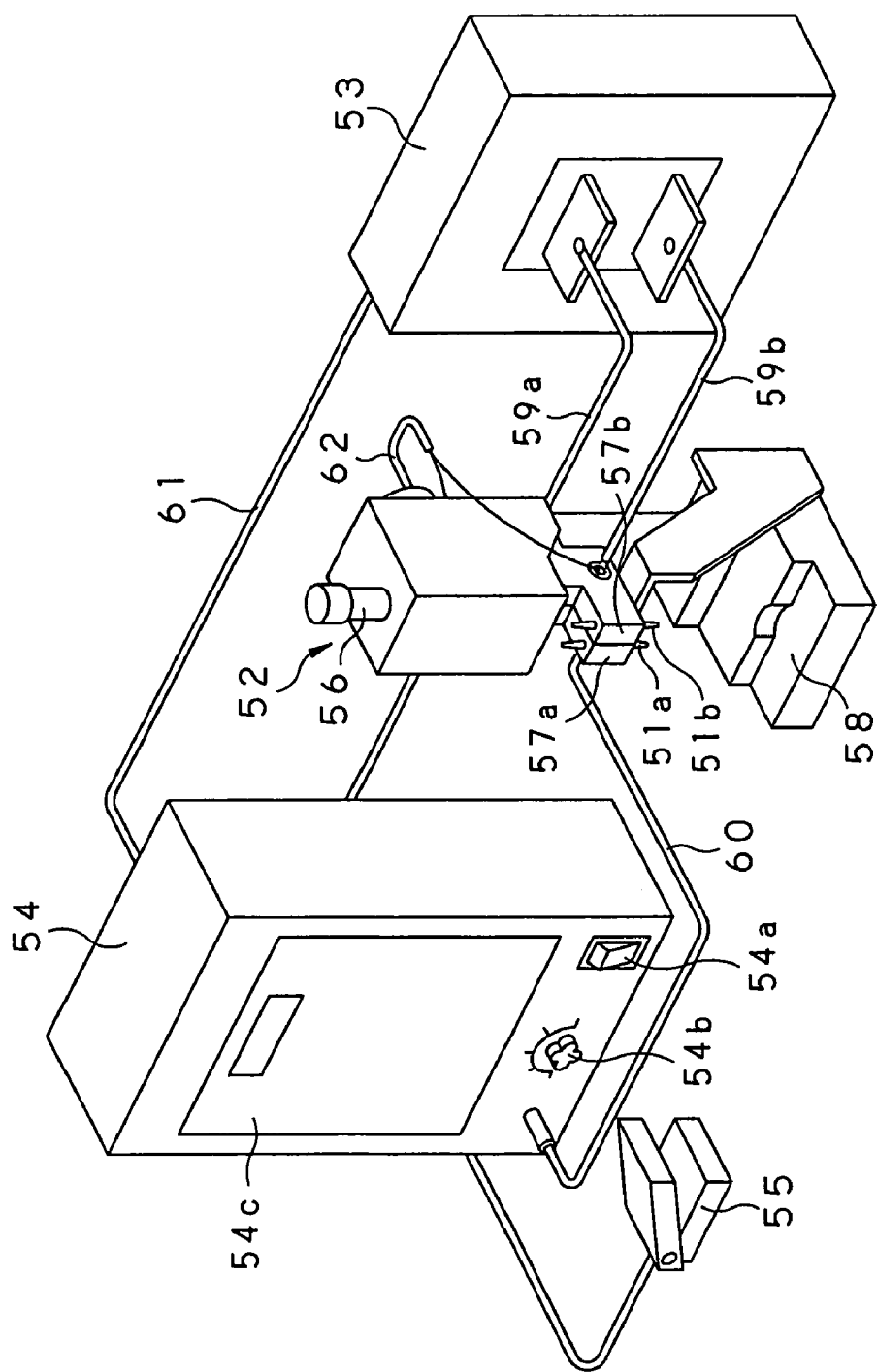
FIG. 10 is a perspective view showing a resistor-welding machine used for connecting lead terminal and battery.

The lead terminals 3 are welded to both end surfaces serving as external terminal of the battery 2 by a resistance-welding machine 50 shown in FIG. 10. The resistance-welding machine 50 includes a welding head 52 provided with a pair of electrode rods 51a, 51b for allowing current to flow with respect to welded material, a welding transformer unit 53 for allowing current to flow in either of the electrode rods 51a, 51b, a control unit 54 for controlling currents, etc. flowing in the electrode rods 51a, 51b, and a switch unit 55 for sending ON signal indicating start of welding operation to the control unit 54.

The welding head 52 comprises a clamping portion 56 driven in upper and lower directions by air cylinder, etc. through biasing member, etc. (not shown) such as coil spring, etc., a pair of electrode rod holding portions 57a, 57b moved in a manner interlocking with drive of the clamping portion 56, and a mount table 58 adapted for mounting the battery 2 serving as welded material thereon and formed by insulating material so that the battery 2 is not externally shorted. Further, in the welding head 52, the electrode rods 51a, 51b are respectively held by a pair of electrode rod holding portions 57a, 57b placed in the state where they are insulated from each other. Moreover, the welding head 52 also includes limit switch (not shown) for transmitting ON signal when a pair of electrode rods 51a, 51b are pressed by welded material at a predetermined pressure value.

The welding transformer unit 53 is connected to respective pair of electrode rod holding portions 57a, 57b of the welding head 52 through a pair of welding cables 59a, 59b taken out from welding transformer (not shown).

The control unit 54 comprises Central Processing Unit (hereinafter referred to as CPU), etc., and serves to control the entirety of the resistance-welding machine 50 in accordance with electric signal such as ON signal and/or instruction signal, etc. which have been transmitted from the external. The control unit 54 comprises a power supply switch 54a for controlling ON/OFF operation of the entirety of the apparatus, a mode changeover switch 54b for performing switching, etc. of voltage applied to the piar of electrode rods 51a, 51b and/or current flowing therein, etc., and a monitor unit 54c, etc. for displaying voltage applied to the piar of electrode rods 51a, 51b and/or current flowing therein, etc. Moreover, the control unit 54 also comprises an actuator cable 60 connected to the welding head 52 and adapted for performing transfer of electronic signal to and from the welding head 52, a power cable 61 connected to the welding transformer unit 53 and adapted for performing transfer of electric signal to and from the welding transformer unit 52, and a voltage detection cable 62 connected to respective pair of electrode rod holding portions 57a, 57b to detect voltage across electrode rods 51a, 51b, etc.

The switch unit 55 is so-called foot switch connected to the control unit 54 by cable, and serving to send ON signal for starting welding operation to the control unit 54.

Figure 11:
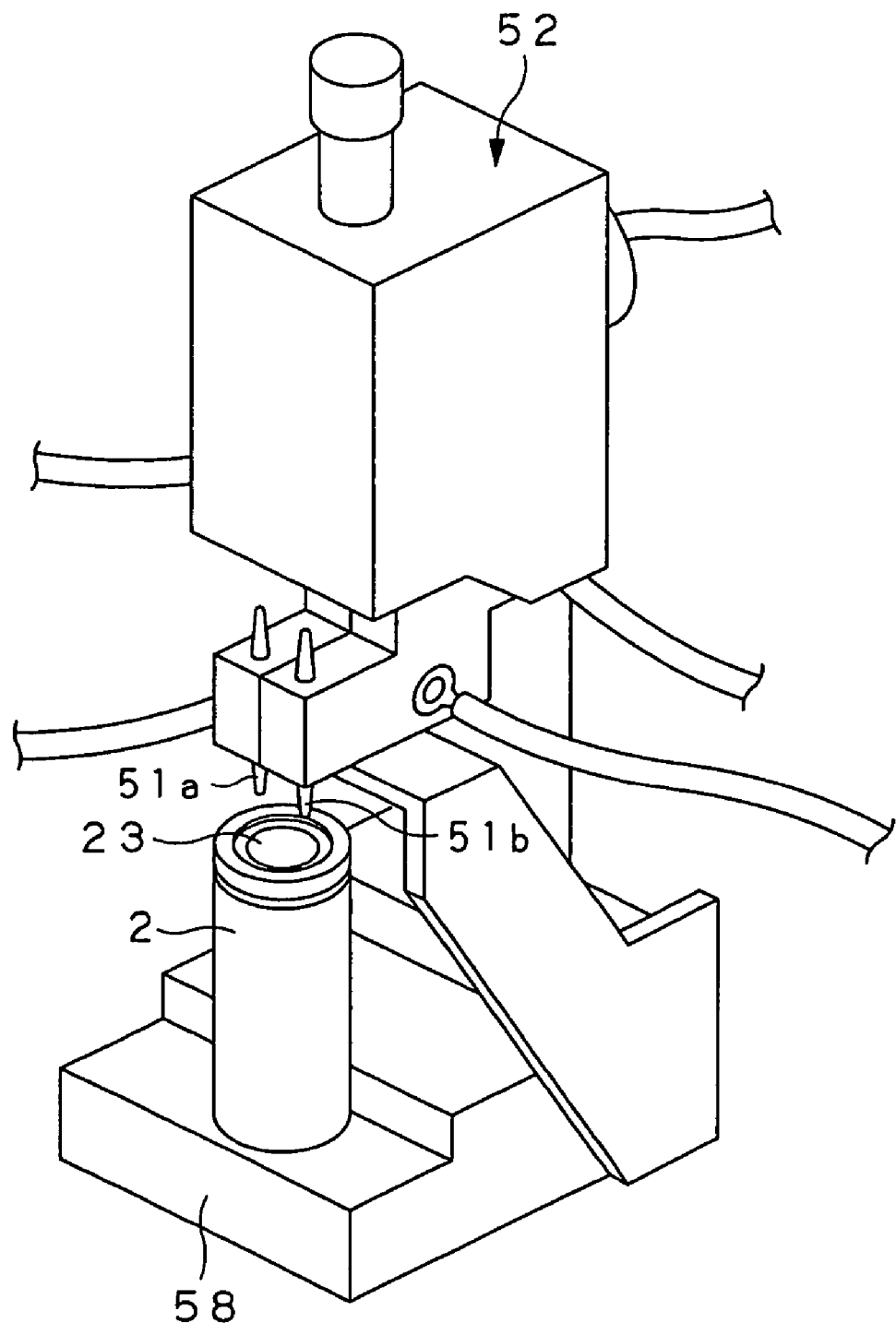
FIG. 11 is a view for explaining a method of connecting lead terminal to the battery, and is a perspective view showing the state where the battery is mounted at welding head.

In connecting the lead terminal 3 to the terminal portion 37a of the cover body 23 by using the resistance-welding machine 50 of such a configuration, the battery 2 is first mounted on a mount table 58 of the welding head 52 in such a manner that the cover body 23 and the electrode rods 51a, 51b are opposite to each other as shown in FIG. 11.

Figure 12:
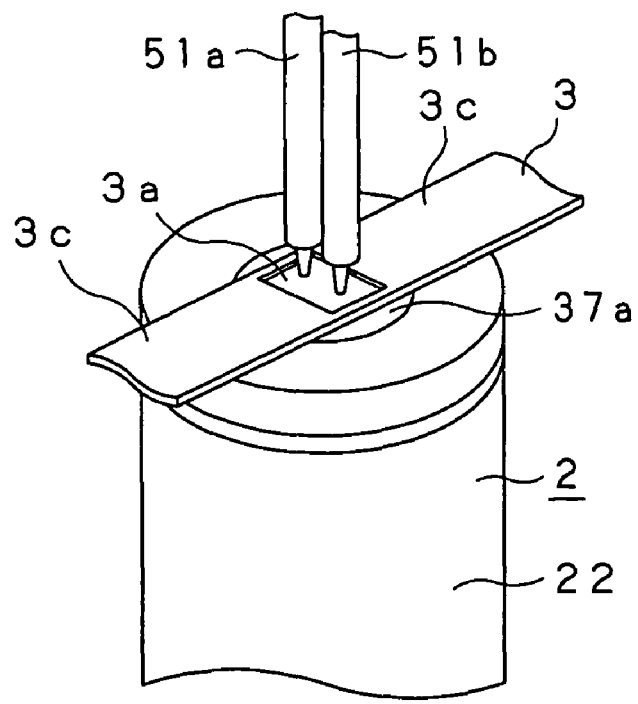
FIG. 12 is a view for explaining a method of connecting lead terminal to the battery, and is a perspective view showing the state where lead terminal is welded to the battery.

Then, as shown in FIG. 12, the welding portion 3a of the lead terminal 3 is disposed at the terminal portion 37a of the cover body 23 in such a manner that the welding portion 3a of the lead terminal 3 is opposite thereto. Thus, flat surface sides having no offset of the welding portion 3a are caused to come into contact therewith.

Then, the switch unit 55 of the resistance-welding machine 50 is turned ON to weld the lead terminal 3 to the terminal portion 37a of the cover body 23.

In concrete terms, when the switch unit 55 is turned ON, the control unit 54 is supplied with ON signal through cable to send, to the welding head 52, an instruction signal that the CPU operates a clamping portion 56 by this ON signal.

Then, the welding head 52 falls the clamping portion 56 by instruction signal from the control unit 54 so that a pair of electrode rods 51a, 51b respectively press welding portions 3a of the lead terminals 3 followed by this falling movement.

Then, at the welding head 52, when pressures that the pair of electrode rods 51a, 51b respectively press welding portions 3a of lead terminals 3 reach a predetermined value, limit switch included therewithin is turned ON to send ON signal.

Then, the control unit 54 is supplied with ON signal that the limit switch of the welding head 52 has sent through the actuator cable 60 to send, to the transformer unit 53, an instruction signal to the effect that the CPU allows current of a predetermined value to flow in the electrode rod 51a by the ON signal.

Then, current that the welding transformer unit 53 has transmitted by the instruction signal which has been sent from the control unit 54 flows from the electrode rod 51a through the welding cable 59a and the electrode rod holding portion 57a to the terminal portion 37a of the terminal plate 37 through the welding portion 3a of the lead terminal 3.

Figure 13:
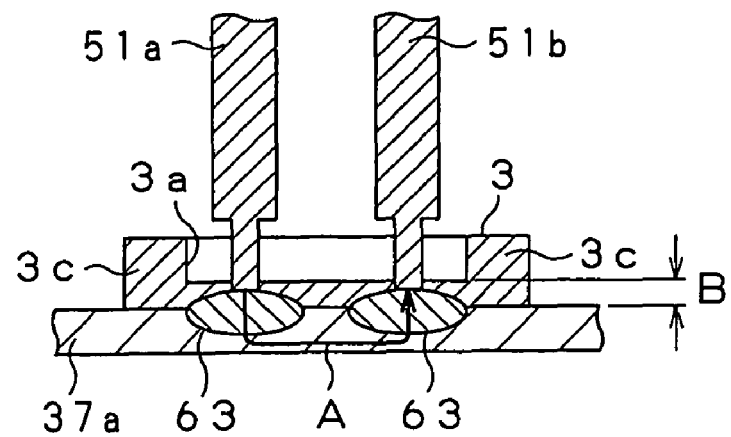
FIG. 13 is a view for explaining a method of connecting lead terminal to the battery, and is an essential part cross sectional view showing, in a model form, the state where current for resistance-welding flows in lead terminal.

At this time, as shown in FIG. 13, electricity of predetermined current value and predetermined voltage value is caused to flow from one electrode rod 51a to the other electrode rod 51b at the lead terminal 3 so that current of the large part flows via a path of the welding portion 3a, the terminal portion 37a and the welding portion 3a, i.e., a path indicated by arrow A in FIG. 13 in practical sense.

Namely, at the lead terminal 3, the thickness of the welding portion 3a is caused to be thinner than thickness of the conductive portion 3c. Since distance B between the electrode rod 51a and the terminal portion 37a is shortened, current for resistance-welding is permitted to flow in a thickness direction of the welding portion 3a. Thus, it can be suppressed that current flowing in plane surface of the lead terminal as in the prior art, so-called reactive current takes place.

Thus, at the lead terminal 3, current for welding flows to much degree in thickness direction of the welding portion 3a. As a result, electric resistance of the welding portion 3a is increased, and colorific value by the electric resistance is also increased. Further, at the lead terminal 3, quantity of metal to be thermally fused or molten at the welding portion 3a and the terminal portion 37a is increased, and welding block produced as the result of the welding portion 3a and the terminal portion 37a are welded each other by heat, so-called nugget 63 can be enlarged. In concrete terms, heat quantity of the welding portion 3a here results in value proportional to square of current for resistance-welding, which flows by the electrode rod 51a.

Accordingly, at the lead terminal 3, since the welding portion 3a is welded to the terminal portion 37a by large welding nugget 63 with high welding strength, the lead terminal 3 is connected to the terminal portion 37a of the cover body 23 in the state where connection reliability has been enhanced (improved).

Figure 14:
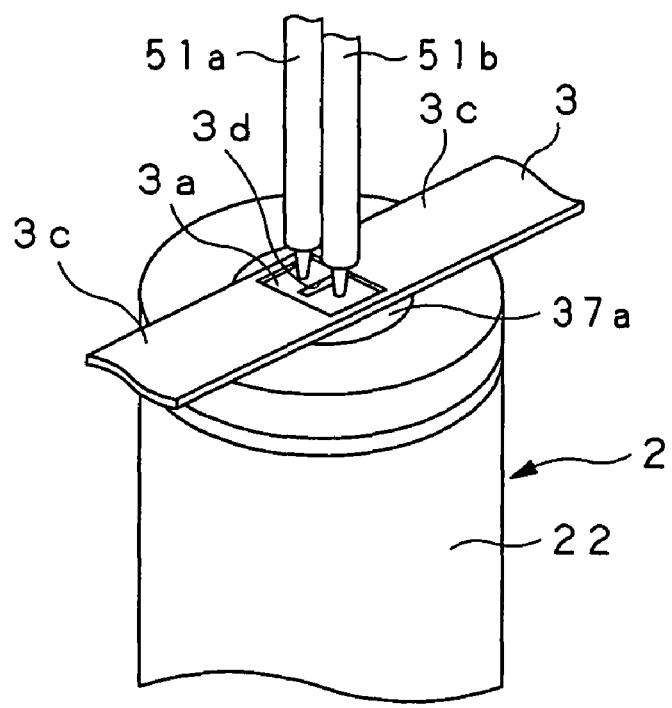
FIG. 14 is a perspective view showing the state where slit is provided at lead terminal, and the battery is welded to the lead terminal.
Figure 15:
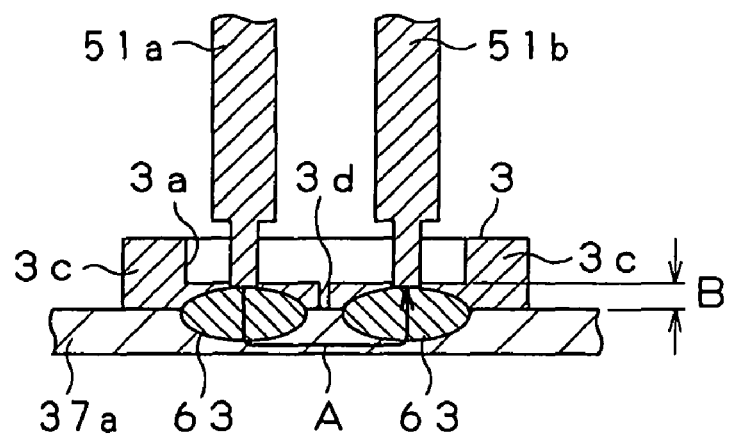
FIG. 15 is an essential part cross sectional view showing, in a model form, the state where slit is provided at lead terminal, and current for resistance-welding flows in the lead terminal.

At the lead terminal 3, as shown in FIG. 14, slits 3d are provided between positions where a pair of electrode rods 51a, 51b are caused to be in contact therewith, thereby making it possible to weld the welding portion 3a to the terminal portion 37 in the state where the connecting reliability has been further enhanced (improved). In concrete terms, as shown in FIG. 15, in addition to the fact that distance between the electrode rod 51a and the terminal portion 37 can be shortened, reactive current flowing only through the lead terminal 3 in the electrode rod 51b from the electrode rod 51a can be further reduced by the slits 3d. Thus, further many active current is permitted to flow in thickness direction of the lead terminal 3. Accordingly, in the lead terminal 3, the slits 3d are provided so that welding nugget 63 can be further enlarged. Thus, the lead terminal portion is welded to the terminal portion 37a with higher welding strength.

Figure 16:
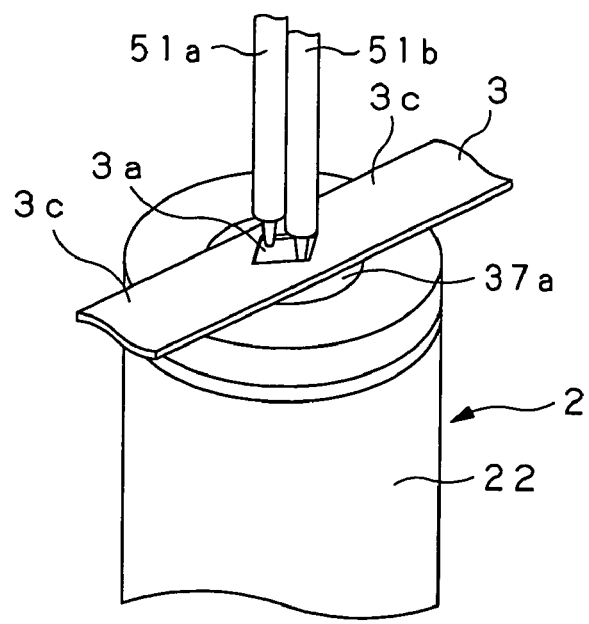
FIG. 16 is a perspective view showing the state where welding portion of lead terminal is formed to be diamond-shaped.

While explanation has been given in the above-described example by taking the example of lead terminal 3 provided with welding portion 3a formed to be substantially rectangular, the present invention is not limited to such implementation, but the welding portion 3a may be as diamond shape, etc. in a manner corresponding to positions of the pair of electrode rods 51a, 51b caused to be in contact therewith as shown in FIG. 16, for example.

Further, lead terminals 3 may be welded to both end surfaces of respective pair of batteries 2a, 2b by a method as stated above to thereby have ability to make (manufacture) the battery module 6. In this example, in the battery 2, an insulating washer 42 and an insulating tube 43 which are caused to intervene between lead terminals 3 connected to the cover body 23 and the armored can 22 are attached so that the armored can 22 and the cover body 23 are not caused to be in contact with each other through lead terminals 3 to make external-short. In concrete terms, the insulating washer 42 is attached at the upper portion of the cover body 23 so that the insulating tube 43 at least covers the portion in the vicinity of the opening portion of the armored can 22 and the outer circumferential surface thereof.

Then, the connecting portion 3b of the lead terminal 3 is welded to connecting lands 7 provided at the circuit wiring board 4 by, e.g., resistance-welding, ultrasonic welding, laser welding, plasma welding or soldering, etc. so that the battery module 6 manufactured in a manner as stated above is electrically connected to the circuit wiring board 4.

Figure 5:
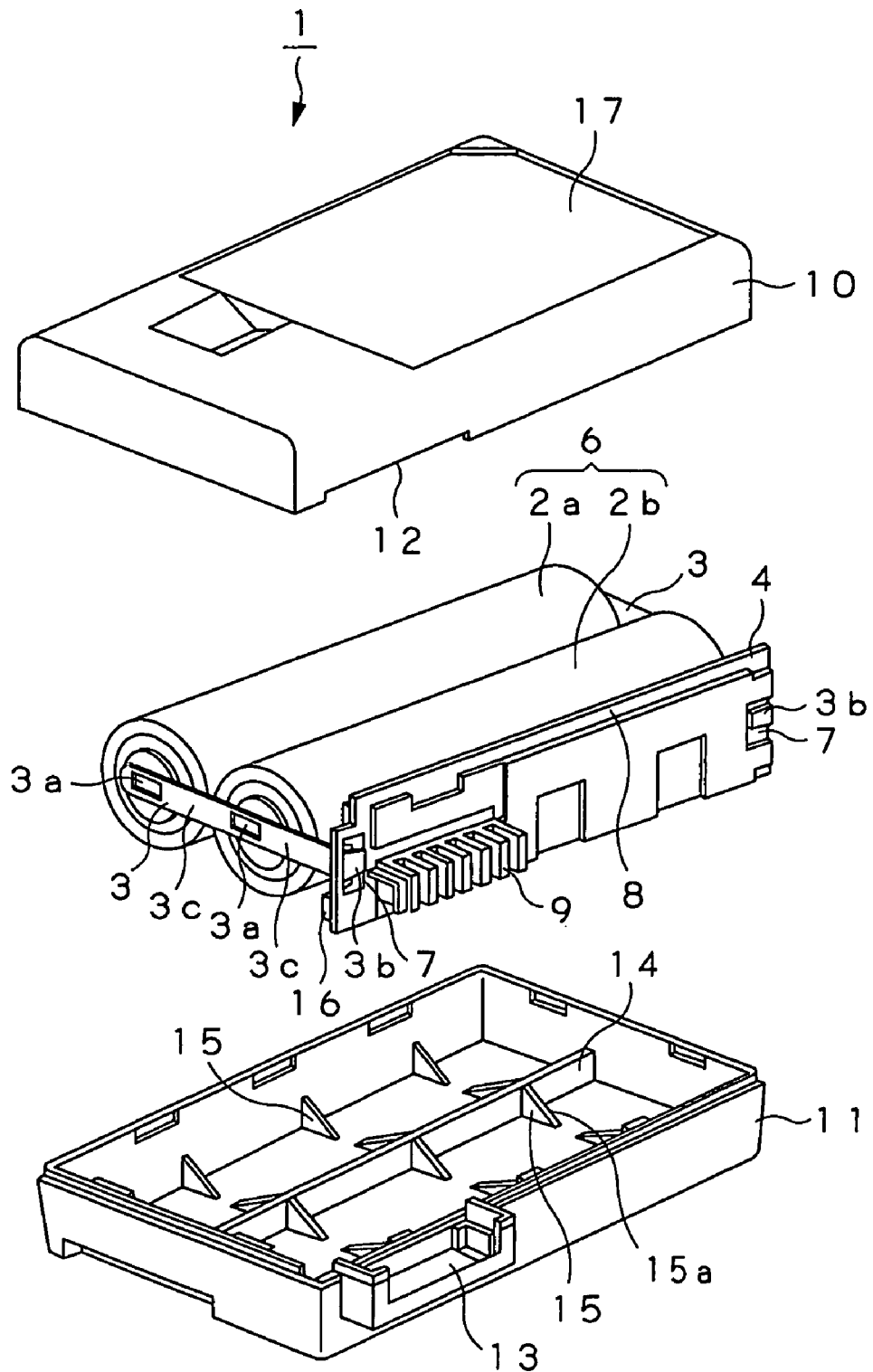
FIG. 5 is an exploded perspective view showing battery pack.

Further, as shown in FIG. 5, the battery module 6 and the circuit wiring board 4 are accommodated between the upper case 10 and the lower case 11 of the accommodating case 5 thereafter to connect or bond these upper and lower cases 10 and 11 in such a manner to but the peripheral walls thereof with each other. In a manner as stated above, the battery pack 1 in which the connector 9 is exposed from the opening portion as shown in FIG. 4 is assembled.

In the battery pack 1 assembled in a manner as stated above, lead terminals 3 are welded to both end surfaces of the pair of batteries 2a, 2b at the battery module in the state where the connecting reliability has been enhanced (improved). When impact is applied from the external, e.g., the battery pack 1 is erroneously fallen down, etc. in detaching it from electronic equipment, etc. as in the prior art, it is possible to prevent inconvenience such that connection between the battery and the lead terminals is broken at the welding portion so that the battery pack is placed in unusable state.

In this battery pack 1, the conductive portion 3c of the lead terminal 3 is caused to be thicker than the welding portion 3a. Thus, it is possible to lessen electric resistance of the lead terminal 3 produced by, e.g., current flowing in length direction of the lead terminal 3 in performing charge/discharge operation.

Thus, in the battery pack 1, since electric resistance of the lead terminal 3 is caused to be small, it is possible to suppress calorific value of lead terminal 3 by electric resistance when current for charge/discharge operation flows in the lead terminal 3. Accordingly, in the battery pack 1, it can be prevented that characteristic is deteriorated by heat of the lead terminal heated by current in charge/discharge operation as in the case of the prior art.

In the battery pack 1, since electric resistance of the lead terminal 3 is caused to be small, it is possible to prevent inconvenience such that temperature fuse or thermostat, etc. provided within the pack becomes operative by electric resistance of the lead terminal when large current is caused to flow as in the case of the prior art, and it thus becomes impossible to perform charge/discharge operation. Accordingly, in the battery pack 1, it is possible to perform so-called charge/discharge operation by the large current in which, e.g., current of the order of 1 C to 2 C per battery based on requirement of electronic equipment, etc. is caused to flow.

Further, in the battery pack 1, since the conductive portion 3c is caused to be thicker than the welding portion 3a so that the surface area of the lead terminal 3 is large, the lead terminal 3 functions as radiating plate, thereby making it possible to further suppress heat of the lead terminal 3 by electric resistance when current for charge/discharge operation flows.

Figure 17:
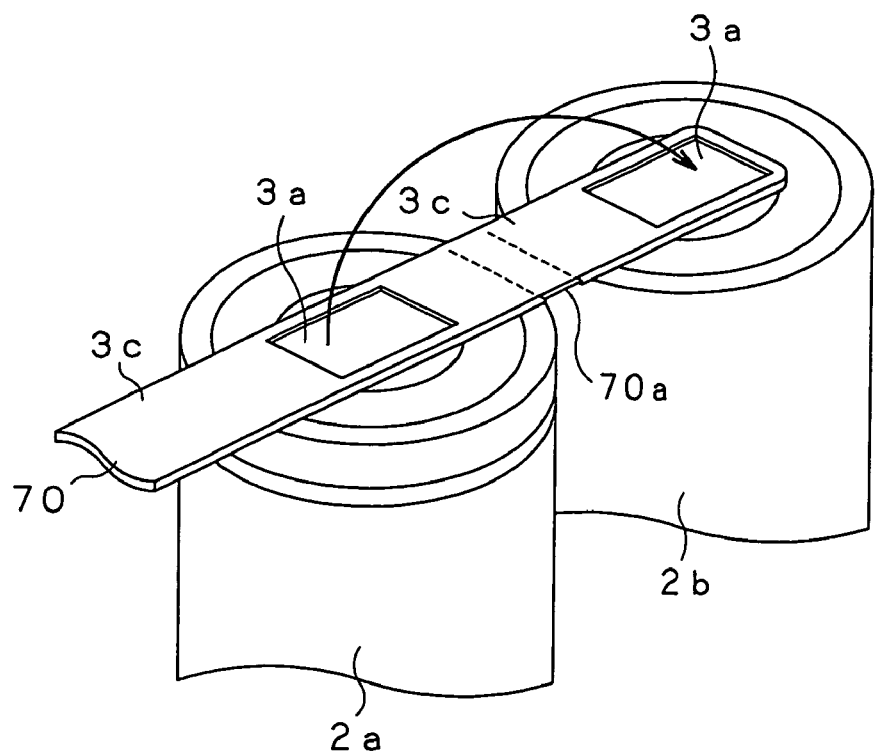
FIG. 17 is a perspective view showing the state where bent portion is provided at the lead terminal.
Figure 18:
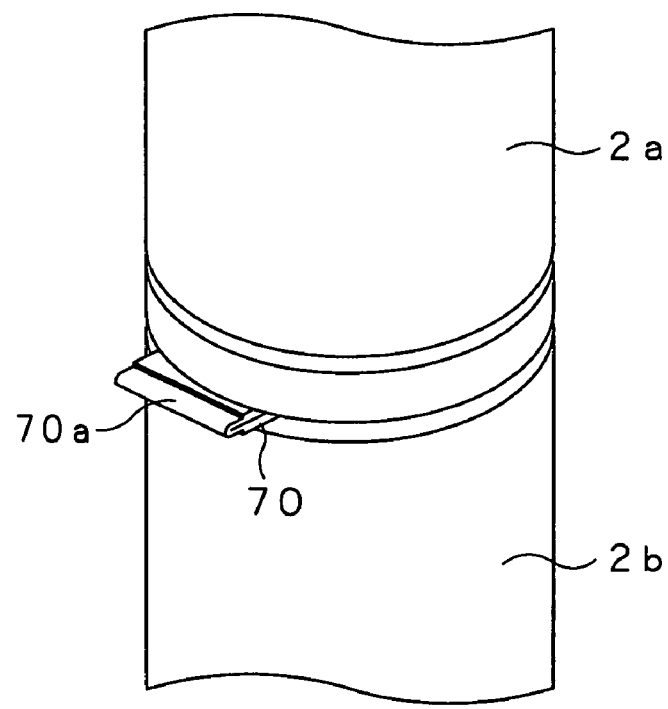
FIG. 18 is a perspective view showing the state where lead terminal is bent at the bent portion.

While explanation has been given in the above-described example by taking the example of the lead terminal where only thickness of the welding portion 3a has been thinned, the present invention is not limited to such implementation, but can be also applied to lead terminal having bent portion 70a in which the thickness thereof is caused to be thinner than the thickness of the conductive portion 3c as in the case of the lead terminal 70 shown in FIGS. 17 and 18. It is to be noted that, in lead terminals 70, 71, 72, 73, 74 which will be explained below, explanation will be omitted and the same reference numeral are used in connection with materials, shapes and portions which are similar to those of the above-described lead terminal 3.

The lead terminal 70 is provided with a bent portion 70a of which thickness has been thinned with respect to the thickness of the conductive portion 3c over the opposite other edge end from one edge end in a short direction at the conductive portion 3c toward opposite other edge end, and can be easily bent in a length direction with the bent portion 70a being as reference.

At the lead terminal 70, the bent portion 70a is formed as the result of the fact that etching processing, etc. is implemented thereto similarly to the welding portion 3a. Accordingly, in forming the welding portion 3a, the bent portion 70a can be collectively formed. The bent portion 70a is adapted so that, in order to facilitate bending of the lead terminal 70, offset obtained by engraving the principal surface of the conductive portion 3c is disposed in a manner faced toward the outside when the lead terminal 70 is bent.

Figure 19:
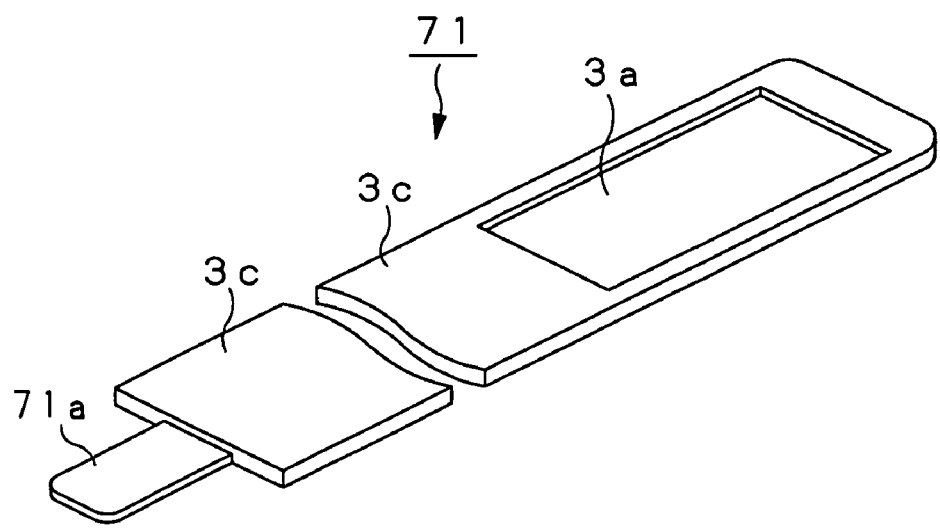
FIG. 19 is a perspective view showing another example of the lead terminal.
Figure 20:
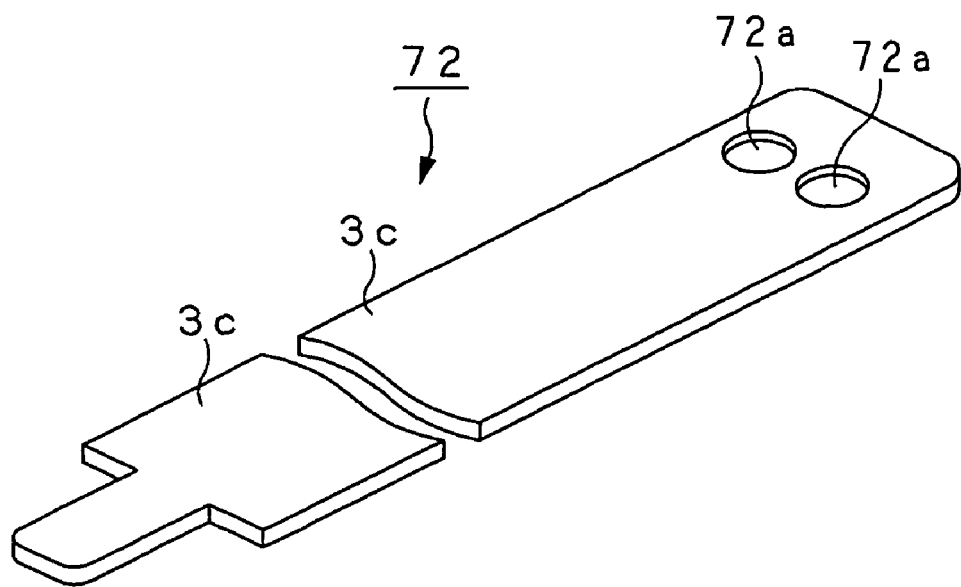
FIG. 20 is a perspective view showing a further example of the lead terminal.

Moreover, in the above-described example, in addition to the lead terminal 3 and/or the lead terminal 70, there may be also used a lead terminal in which, e.g., the thickness of the connecting portion 71a connected to the connecting land 7 of the circuit wiring board 4 is caused to be thinner than thickness of the conductive portion 3c as in the case of the lead terminal 71 shown in FIG. 19.

At the lead terminal 71, since there is provided connecting portion 71a of which thickness is caused to be thinner than the thickness of the conductive portion 3c, it can be suppressed that heat used for soldering is radiated from the connecting portion 71a in soldering the conductive portion 71a to connecting land 7 of the circuit wiring board 4. Accordingly, the lead terminal 71 can be connected to the connecting land 7 in the state where the connection reliability of the connecting portion 71a has been enhanced (improved). Moreover, since the connecting portion 71a can be easily warmed, it is possible to shorten the time required for soldering the connecting portion 71a to the connecting land 7. In this example, also in the lead terminal 71, the connecting portion 71a is thinned as the result of the fact that etching processing, etc. is implemented thereto similarly to the welding portion 3a. Accordingly, connecting portions 71a can be collectively formed in forming the welding portions 3a.

Further, in the above-described example, there may be also used lead terminal in which plural connecting portions 72a of which thickness is caused to be thinner than the thickness of the conductive portion 3c are provided, e.g., only at portions with which a pair of electrode rods 51a, 51b are caused to be in contact in resistance-welding.

At the lead terminal 72, since the area of the conductive portion 3c of which thickness is thicker than the welding portion 72a becomes large, it is possible to further reduce electric resistance produced by current flowing in a length direction, e.g., in performing charge/discharge operation. Accordingly, at the lead terminal 72, since the electric resistance is caused to be smaller, heat and voltage drop by electric resistance produced by current for charge/discharge operation can be further suppressed.

Figure 21:
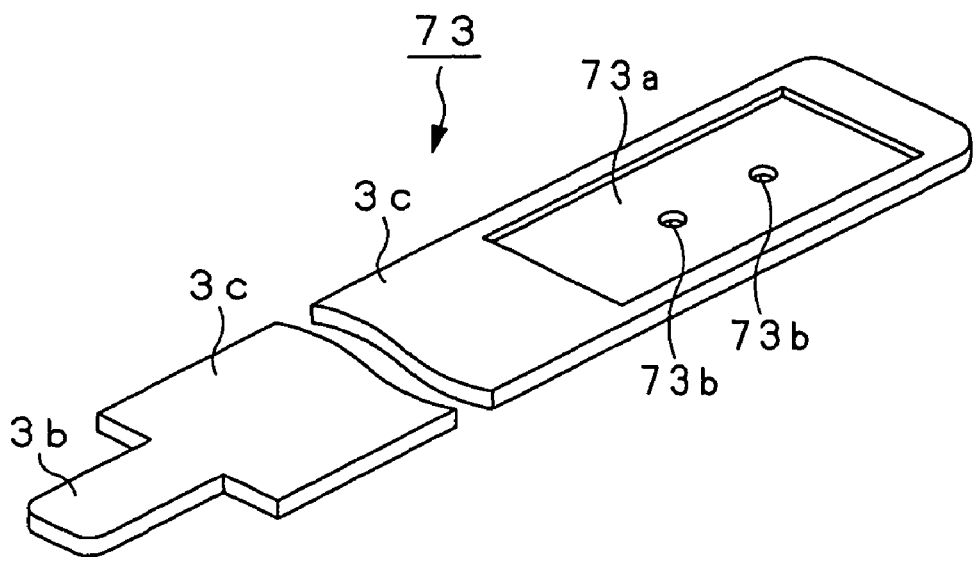
FIG. 21 is a perspective view showing a still further example of the lead terminal.

Furthermore, in the above-described example, as in the case of the lead terminal 73 shown in FIG. 21, there may also used, e.g., a lead terminal in which hole portions 73b penetrated in a thickness direction are formed at the welding portion 73a.

At this lead terminal 73, since hole portions 73b are provided at the welding portion 73a, yielding at the time of manufacturing pack can be improved such that hole portion 73b is caused to be mark in performing resistance-welding so that the time required for resistance-welding can be shortened, etc.

Figure 22A:
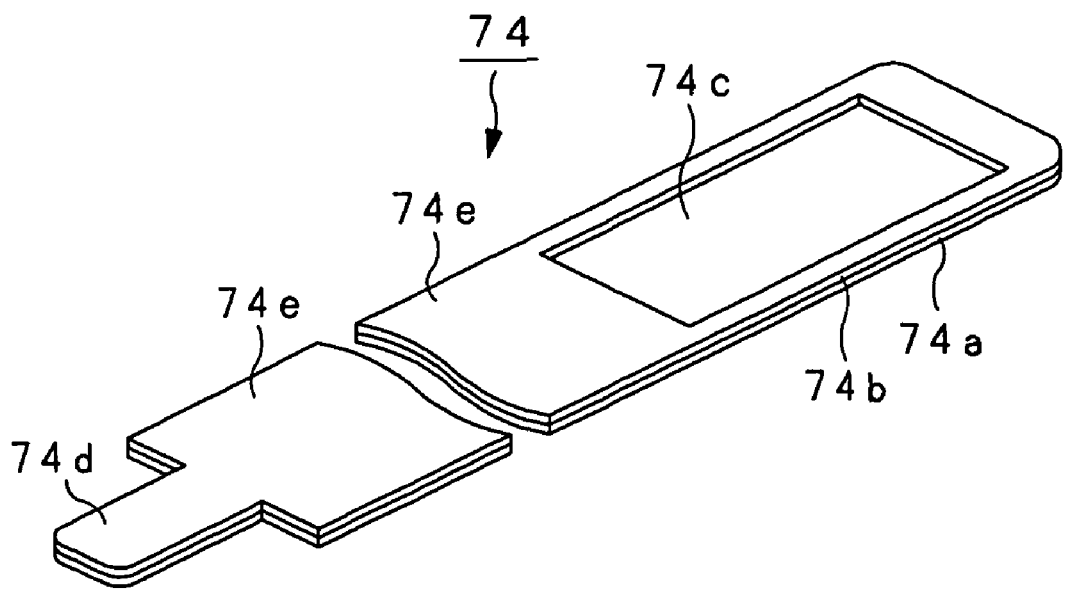
FIG. 22A is a perspective view showing a still more further example of the lead terminal.
Figure 22B:
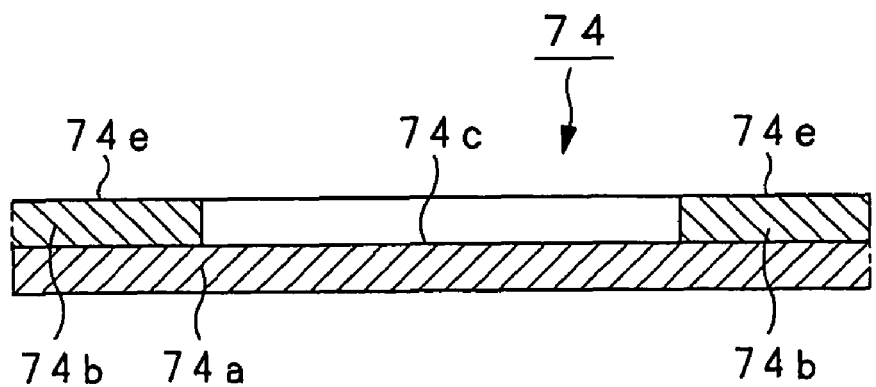
FIG. 22B is an essential part cross sectional view thereof.

Furthermore, while explanation has been given in the above-described example by taking the example of lead terminal 3 in which the welding portion 3a, the connecting portion 3b and the conductive portion 3c are integrally formed by single conductive metal, etc., the present invention is not limited to such implementation, but there can be also used lead terminal formed by clad material, etc. in which, e.g., plural layers of conductive metals having different conductivities are laminated as in the case of the lead terminal 74 shown in FIGS. 22A to 22B.

The lead terminal 74 is constituted by, e.g., a first metal layer 74a consisting of first conductive metal containing any one kind or more of nickel, nickel alloy, iron, iron alloy, stainless steel, zinc and zinc alloy, and a second conductive metal layer 74b consisting of second conductive metal containing any one kind or more of copper, copper alloy, silver, silver alloy, gold, gold alloy, platinum, platinum alloy, aluminum, aluminum alloy, tungsten, tungsten alloy, beryllium, beryllium alloy, rhodium, and rhodium alloy. In concrete terms, the lead terminal 74 is laminated material, i.e., clad material in which metal foil consisting of first conductive metal and metal foil consisting of second conductive metal having conductivity caused to be higher than that of the first conductivity metal are pressurized while heating these conductive metals in the state where they are laminated so that opposite principal surfaces of these metal foils are press-fitted and are connected (bonded) to constitute the first metal layer 74a and the second metal layer 74b.

It is to be noted that, in the lead terminal 74, e.g., metal foil consisting of first conductive metal and metal foil consisting of second conductive metal may be also heated and pressurized, etc. in the state where those metal foils are laminated through, e.g., conductive adhesive agent or soldering film, etc. therebetween to laminate and connect (bond) the first metal layer 74a and the second metal layer 74b. Moreover, the first metal layer 74a and the second metal layer 74b may be laminated and connected (bonded) by the cold pressure-fit method, etc. of simply pressurizing the first metal layer 74a and the second metal layer 74b in the state where they are laminated. Further, the first metal layer 74a and the second metal layer 74b may be resistance-welded at a predetermined portion in the state where they are laminated to thereby laminate and connect (bond) them.

Further, etching processing, etc. is implemented in the state where portions except for the portion where welding portion 74c is provided of the principal surface of the second metal layer 74b is masked until the first metal layer 74a is exposed so that welding portion 74 where the first conductive metal is exposed is formed. In this example, similarly to the above-described lead terminal 3, the lead terminal 74 also includes a connecting portion 74d connected to connection land 7 of the circuit wiring board 4 by soldering, etc., and a conductive portion 74e for allowing the welding portion 74c and the connecting portion 74d to electrically conduct.

At the lead terminal 74, the welding portion 74c is constituted only by first conductivity metal having conductivity lower than that of the second conductive metal, and electric resistance per unit volume by active current flowing in thickness direction of the welding portion 74c in resistance-welding becomes large. From this fact, calorific value by this electric resistance becomes large.

In concrete terms, at the lead terminal 74, since thermal conductivity of the first conductive metal having low conductivity is generally low, heat of the welding portion 74c is difficult to be radiated toward the periphery so that temperature elevation of the welding portion 74c becomes large. Moreover, at the lead terminal 74c, the welding portion 74c is thin. For example, since distance between the electrode rod 51a and the terminal portion 37a in performing resistance-welding becomes short, value of current for resistance-welding flowing in the welding portion 74c is increased. From these facts, at the lead terminal 74, the welding portion 74c can be welded to the external terminal of the battery 2 with high welding strength. In this case, half part or more of calorific value contributing to the resistance-welding here is contact resistance of the connecting (bonding) surface between the welding portion 74c and the external terminal of the battery 2.

At the lead terminal 74, a conductive portion 74e is adapted so that second metal layers 74b formed by metal such as copper, etc. having conductivity higher than that of the first metal layer 74a is laminated in addition to the first metal layer 74a. From this fact, as compared to the lead terminal 3 formed by one kind of metal or alloy, e.g., nickel, iron, stainless steel, zinc, and zinc alloy, etc., electric resistance produced by current flowing in a length direction, e.g., in performing charge/discharge operation of the battery pack 1 can be further reduced. Accordingly, at the lead terminal 74, since electric resistance can be further reduced by the second metal layer 74b of the conductive portion 74e, it is possible to further suppress calorific value and voltage drop by electric resistance produced by current for charge/discharge operation.

At the lead terminal 74, it is also possible to provide a bent portion 70a as in the case of the above-described lead terminal 70, and it is also possible to thin the connecting portion 74d so that it is thinner than the conductive portion 74e as in the case of the above-described lead terminal 71. Moreover, at the lead terminal 74, while explanation has been given by taking the example of the case where clad member of two-layer structure is used, clad material, etc. of two layers or more may be also used.

At the lead terminal 74, the surface of conductive metal, etc. having rust proof characteristic, e.g., gold or nickel, etc. is covered by electrolytic plating or non-electrolytic plating, etc., thereby also making it possible to prevent rust. Thus, at the lead terminal 74, since the surface thereof is caused to undergo rust-proofing so that large current flows in the welding portion 74c at the time of resistance-welding. From this fact, it is possible to reasonably dissolve the welding portion 74c and the external terminal of the battery. Thus, welding strength can be increased.

For example, in the case where rust takes place on the surface of the lead terminal 74, there is the possibility that current in performing resistance-welding become difficult to flow in the welding portion 74c on the connecting surface by rust so that it becomes difficult to perform resistance-welding. Moreover, in this case, at the connecting portion 74d, since rust prevents alloy layer formation with respect to solder in performing soldering with respect to connecting land 7, there is the possibility that connecting strength with respect to the connecting land 7 may be weakened. Particularly, at the lead terminal 74, in the case where, e.g., copper is included, because rust is easy to take place, effect/advantage resulting from the fact that the surface is covered by conductive metal having rust-proof characteristic as stated above becomes great.

It is to be noted that in the case where the surface of the lead terminal 74 is covered by conductive metal having high rust proof characteristic, since the layer of conductive metal having rust proof characteristic is formed by plating, etc. so that it is thin, and the conductive metal having high rust characteristic is melt into the lead terminal 74 side at the time of resistance-welding, it is possible to perform resistance-welding of the welding portion 74c and the external terminal of the battery without lowering welding strength. Moreover, while explanation has been given here by taking the example of the lead terminal 74 consisting of clad material, etc., similar effects/advantages can be obtained also in the case where the layer of conductive metal having high rust characteristic is provided on the surface of the lead terminal 3, etc. consisting of the above-described one kind of metal or alloy, etc.

Figure 23:
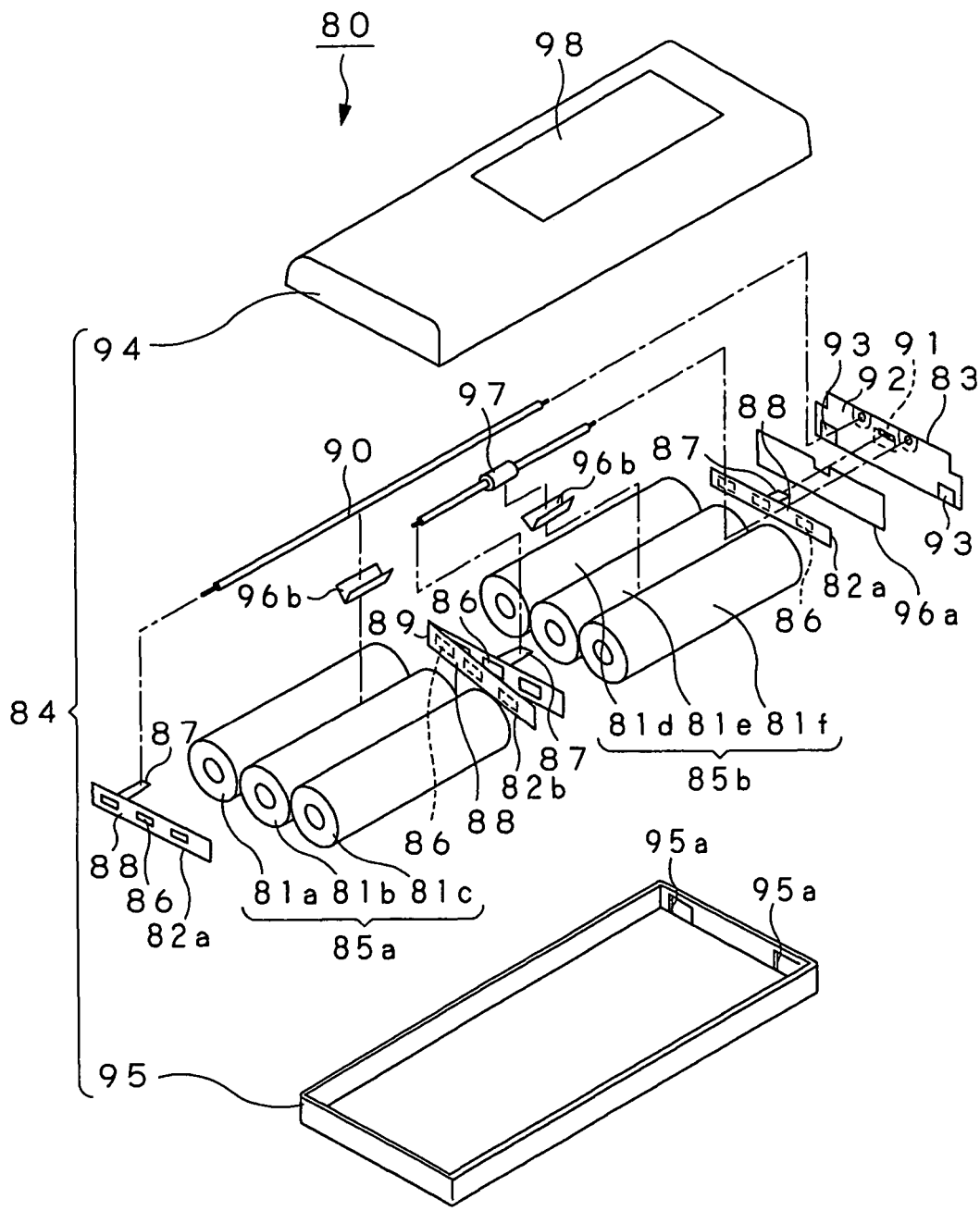
FIG. 23 is an exploded perspective view perspectively showing a portion of another example of battery pack according to the present invention.

Furthermore, while explanation has been given in the above-described example by taking the example of the battery pack 1 provided with single battery module 6 in which batteries 2a, 2b are connected in parallel, the present invention is not limited to the battery pack 1 of such a configuration, but can be also applied to battery pack 80 provided with two battery modules or more in which two batteries or more are provided as shown in FIG. 23.

Similarly to the above-described battery pack 1, the battery pack 80 is loaded with respect to loading portion provided at electronic equipment, etc., e.g., note-type personal computer, etc. to have ability to stably supply power of a predetermined voltage with respect to electronic equipment, etc.

Further, the battery pack 80 includes substantially columnar six batteries 81a, 81b, 81c, 81d, 81e, 81f serving as power generating element, lead terminals 82a, 82b connected to external terminals of these batteries 81a to 81f, and a circuit wiring board 83 electrically connected to the batteries 81a to 81f and serving to perform charge/discharge control, etc. with respect to the batteries 81a to 81f, wherein the batteries 81a to 81f, the lead terminal 82 and the circuit wiring board 83 are accommodated within substantially box-shaped accommodating case 84.

The battery pack 80 is adapted so that batteries 81a to 81f are connected in parallel three by three to respectively constitute integrated battery modules 85a, 85b, and these battery modules 85a, 85b are accommodated in the state where they are connected in parallel on the circuit wiring board 83. In concrete terms, the battery module 85a is constituted by batteries 81a to 81c, and the battery module 85b is constituted by batteries 81d to 81f. It is to be noted that while explanation will be given here in connection with battery modules 85a, 85b in which batteries 81a to 81f are connected in parallel three by three, the present invention is not limited to such implementation, but, e.g., battery module in which plural batteries 81a to 81f are connected in series may be employed, and the number of battery modules and/or arrangement thereof may be arbitrarily selected. In this example, in the case where unspecific batteries 81a to 81f are indicated, label is made simply as battery 81.

In the battery pack 80, in order to connect batteries 81a to 81f in parallel three by three to constitute battery modules 85a, 85b, lead terminals 82a, 82b consisting of conductive metal, etc. which are material similar to the above-described lead terminal 3. In concrete terms, the lead terminal 82a connects end surfaces caused to have the same polarity of the batteries 81a to 81c at the battery module 85a and end surfaces caused to have opposite polarity with respect to the end surface connected at the lead terminal 82a of the battery module 85a of batteries 81d to 84f at the battery module 85b, and the lead terminal 82b collectively connects end surface opposite to the side with respect to the end surface connected at the lead terminal 82a of the battery modules 85a, 85b. Namely, the lead terminal 82b serves to connect, in series, the battery module 85a in which batteries 81a to 81c are connected in parallel and the battery module 85b in which batteries 81d to 81f are connected in parallel.

The lead terminals 82a, 82b caused to constitute the battery modules 85a, 85b are belt-shaped conductive metal consisting of material similar to that of the above-described lead terminal 3, and includes plural welding portions 86 connected to both end surfaces serving as external terminal of the battery 82, a connecting portion 87 connected to a connection land 91, etc. of the circuit wiring board 83, and a conductive portion 88 positioned between these welding portions 86 and between the welding portion 86 and the connecting portion 87, and serving to allow connection portions to electrically conduct. Moreover, in the lead terminal 82b, in addition to these welding portion 86, connecting portion 87 and conductive portion 88, a bent portion 89 similar to the above-described lead terminal 70 is provided in the vicinity of substantially central portion in length direction.

In these lead terminals 82a, 82b, similarly to the lead terminal 3, thickness of the welding portion 86 is caused to be within the range thinner than thickness of the conductive portion 88. For this reason, since welding portions 86 respectively welded to both end surfaces serving as external terminal of the battery 81 are thinner than the conductive portion 88 in the lead terminals 82a, 82b, large part of current for welding flowing in the welding portion 86 in welding end surface of the battery 81 and the welding portion 86 is permitted to flow in thickness direction of the welding portion 86. Accordingly, even at the lead terminals 82a, 82b, similarly to the above-described lead terminal 3, the welding portion 86 can be welded to the end surface of the battery 81 with high welding strength.

Moreover, at these lead terminals 82a, 82b, since the conductive portion 88 for allowing the welding portion 86 welded to the battery 81 and the connecting portion 87 connected to the circuit wiring board 83 to electrically conduct is thicker than the welding portion 86, electric resistance of the conductive portion 88 in allowing electricity (current) for charging/discharging the battery 81 to flow can be reduced. Accordingly, even at these lead terminals 82a, 82b, even in the case where large current of the order of 1 C to 2 C flows in the battery 81, e.g., by requirement of electronic equipment, etc., similarly to the above-described lead terminal 3 calorific value by electric resistance can be reduced.

Further, at the lead terminal 82b, since bent portion 89 similar to the above-described lead terminal 70 is provided, it is possible to easily perform bending of the lead terminal 82*b* in a length direction with the bent portion 89 being as reference.

In this example, also in lead terminals 82*a*, 82*b*, etching processing, etc. is implemented in the state where portions except for the portions where the welding portion 86 and/or bent portion 89 are provided are masked so that the welding portions 86 and/or the bent portion 89 which have thin thickness are provided to control the time where those lead terminals are immersed into etchant, etc., thereby permitting these portions to have a predetermined thickness. Moreover, these welding portion 86 and/or bending portion 89 can be formed as lead terminals 82*a*, 82*b* by a method, e.g., laser processing or drawing processing, etc. in addition to etching processing, etc.

In addition to effects/advantages as stated above, since these lead terminals 82*a*, 82*b* connect both end surfaces of plural batteries 81, the battery 81 is prevented from being rotated in outer circumferential direction to fix these batteries 81 in the state where they are adjacent to each other.

Further, as the result of the fact that the connecting portion 87 is directly welded to connecting land 91, etc. of the circuit wiring board 83 by, e.g., soldering, etc., the lead terminals 82*a*, 82*b* electrically connect the circuit wiring board 83 and the battery modules 85*a*, 85*b* are electrically connected. Moreover, at the lead terminals 82*a*, 82*b*, the connecting portion 87 is bent at the boundary portion with respect to the conductive portion 89 so that it is caused to be along the outer circumferential surface of the battery 81 to also have ability to connect battery modules 85*a*, 85*b* to the circuit wiring board 83 through lead wire 90 and/or temperature fuse element 97, etc. which are connected to the connecting portion 87 by implementing soldering, etc. thereto.

In this example, in the case where the connecting portion 87 is bent at the boundary portion with respect to the conductive portion 89 in a manner along the outer circumferential surface of the battery 81, the connecting portion 87 is caused to be along space formed between outer circumferential surfaces of the batteries 81 adjacent to each other. Namely, space formed as the result of the fact that outer circumferential surfaces of respectively substantially columnar batteries 81 are caused to be adjacent results in dead space within the accommodating case 4. The connecting portion 87 for lead terminals 82*a*, 82*b* is disposed at the dead space. Thus, in the battery modules 85*a*, 85*b*, the connecting portions 87 are not put between adjacent batteries 81 so that they can be integrated in the state where no gap is formed between adjacent batteries 81. Thus, miniaturization can be realized. In the battery module 85*a*, the connecting portions 87 for lead terminals 82*a*, 82*b* are disposed at the dead space formed between the adjacent batteries 81*a* and 81*b*, and in the battery module 85*b*, the connecting portions 87 for lead terminals 82*a*, 82*b* are disposed at the dead space formed between the adjacent batteries 81*e* and 81*f*.

The circuit wiring board 83 to which battery modules 85*a*, 85*b* are connected through lead terminal 82*a* and/or lead wire 90 is adapted so that pattern wiring (not shown) consisting of conductive metal, etc. and including lead terminal 82*a* and/or connecting land 91 to which the lead wire 90 is connected, and/or electronic circuit, etc. (not shown) connected to the pattern wiring and serving to perform charge/discharge control, and/or over-discharge and/or over-charge protection, etc. is provided on a plate-shaped base portion 92 consisting of insulating resin, etc.

Moreover, an external unit 93 electrically connected to pattern wiring, etc. by, e.g., soldering, etc. is attached to the circuit wiring board 83. When the battery pack 80 is connected to the electronic equipment, the external terminal 93 is engaged with external terminal, etc. provided at the electronic equipment so that the external terminal 93 is electrically connected thereto to thereby function as a supply port for supplying electricity (current) with respect to electronic equipments, etc. Further, in charging the battery modules 85*a*, 85*b*, the external terminal 93 serves as a connecting portion to which, e.g., AC power supply, etc. is connected. The circuit wiring board 83 is accommodated within an accommodating case 84 in a manner along the side wall of the accommodating case 84 in the state where, e.g., side wall of substantially box-shaped accommodating case 84 and the principal surface of the base portion 82 are opposite to each other.

The accommodating case 84 within which battery modules 85*a*, 85*b* and circuit wiring board 83 are accommodated consists of insulating resin, etc., e.g., polycarbonate or ABS resin, etc., and is composed of an upper case 94 and a lower case 95. The upper case 94 and the lower case 95 respectively have shape in which side walls are projected along the outer circumferential edge portion of substantially rectangular principal surfaces and respective side walls are butted to each other so that substantially box-shaped accommodating case 84 is provided.

At the accommodating case 84, an opening portion 95*a* for allowing the external terminal 93 provided at the circuit wiring board 83 to be exposed to the outside is formed at the side wall of the lower case 95.

Further, within the battery pack 80 of such a configuration, there are also accommodated, in addition to the battery modules 85*a*, 85*b*, the circuit wiring board 83 and/or the lead wire 90 which have been described above, etc., e.g., an insulator 96*a* for insulation for preventing contact between battery modules 85*a*, 86*b* and circuit wiring board 83 and/or contact between battery modules 85*a*, 85*b* and the lead wire 90, a holding insulator 96*b* for holding the lead wire 90 at dead space provided at battery modules 85*a*, 85*b*, and a temperature fuse element 97 for detecting temperature changes of the battery modules 85*a*, 85*b* to interrupt current when temperature reaches a predetermined value or more, etc.

The insulator 96*a* for insulation consists of sheet-shaped insulating material, etc., e.g., polyethylene, polypropylene, or imcombusitible paper, etc., and is disposed between battery modules 85*a*, 85*b* and the lead wire 90, and/or between the battery modules 85*a*, 85*b* and the circuit wiring board 83. Thus, at the battery pack 80, when it undergoes, e.g., impact of falling, etc., since the insulator 96*a* serves to prevent battery modules 85*a*, 85*b* from coming into contact with the circuit wiring board 83 and/or the lead wire 90, it is possible to prevent external short of the battery 81 taking place as the result of the fact that the battery modules 85*a*, 85*b* come into contact with the circuit wiring board 83 and/or the lead wire 90.

The holding insulator 96*b* consists of sheet-shaped insulating material, etc., e.g., polyethylene, polypropyrene, or imcombustible paper, etc. The holding insulator 96*b* has shape in which sheet-shaped insulating material is valley-folded at the tangential line where outer circumferential surfaces of adjacent batteries 81 at the battery modules 85*a*, 85*b* are in contact with each other. Further, at the holding insulator 96*b*, lead wire 90 and/or temperature fuse element 97, etc. are disposed at portions of valley, thereby making it possible to hold the lead wire 90 and/or temperature fuse element 97, etc. at dead space where the battery modules 85*a*, 85*b* are provided.

Moreover, at the battery pack 80, when it undergoes impact, e.g., falling, etc., since the holding insulator 96*b* functions as a buffer material with respect to the lead wire 90 and/or the temperature fuse element 97, it can be suppressed that connection between the lead wire 90 and the connecting portion 87 of the lead terminals 82a, 82b may be broken, and/or the temperature fuse element may be damaged.

The temperature fuse element 97 is disposed at dead space provided at the battery modules 85a, 85b through the insulator 96b. The temperature fuse element 97 is a protection element that in the case where the battery modules 85a, 85b are placed in over-charge state, or over-discharge state owing to, e.g., erroneous operation of the battery pack 80, the temperature fuse element 97 detects temperatures of the battery modules 85a, 85b to interrupt current when temperature reaches a predetermined value so that over-charge or over-discharge proceeds no longer.

Moreover, at the battery pack 80, there is attached, on the outer circumference of the accommodating case 4, a label 98 in which e.g., manufacturing lot No. is indicated to thereby clarify source, etc. of the battery modules 85a, 85b and/or the circuit wiring board 83, etc.

It is to be noted that, at the battery pack 80, similarly to the above-described battery pack 1, there may be provided battery partition wall capable of preventing that battery modules 85a, 85b collide with each other therewithin, and/or battery holding piece for permitting the battery modules 85a, 85b to be accommodated therewithin without shaking, etc.

Also in the battery pack 80 of the configuration as stated above, lead terminals 82a, 82b are welded to both end surfaces of the battery 81 at the battery modules 85a, 85b in the state where connecting reliability has been enhanced (improved). Thus, it is possible to prevent an inconvenience such that connection between the battery and the lead terminal is broken at the connecting portion so that the battery pack becomes unavailable or unusable, which takes place as the result of the fact that impact is applied from the outside as in the prior art.

Moreover, even in the battery pack 80, since electric resistance values of the lead terminals 82a, 82b are caused to be small, it is possible to prevent an inconvenience such that temperature fuse 97, etc. provided within the pack becomes operative by heat by electric resistance of the lead terminal in allowing large current to flow as in the prior art so that charge/discharge operation cannot be performed. Accordingly, even in the battery pack 80, it is possible to perform charge/discharge operation by so-called large current for allowing current of the order of 1 C to 2 C per battery to flow, for example.

It should be noted that while explanation has been given in the above-described examples by taking example of cylindrical lithium ion secondary battery as the battery 2, the present present invention is not limited to such an implementation, but can be applied to primary battery and/or polymer battery, etc. in which lead terminal is attached to external terminal irrespective of shape, e.g., rectangular type battery, thin type battery, coin type battery and/or button type battery, etc.

It is to be noted that while the present invention has been described in accordance with certain preferred embodiments thereof illustrated in the accompanying drawings and described in detail, it should be understood by those ordinarily skilled in the art that the invention is not limited to embodiments, but various modifications, alternative construction or equivalents can be implemented without departing from the scope and spirit of the present invention as set forth by appended claims.

INDUSTRIAL APPLICABILITY

As described above, in accordance with the present invention, the portion in which the thickness of the lead terminal is thin is welded to the external terminal of the battery, thereby making it possible to weld the lead terminal in the state where the connecting reliability has been enhanced (improved). From this fact, e.g., when impact is applied from the external portion, it can be prevented that connection between lead terminal and battery is broken at welding portion. Moreover, in accordance with the present invention, the portion in which thickness is large of the lead terminal serves to reduce electric resistance of the lead terminal taking place by current flowing in plane direction of the lead terminal. Accordingly, in accordance with the present invention, since heat by electric resistance when current flows in the lead terminal is suppressed, it can be prevented that the battery characteristic may be deteriorated by heat of the lead terminal heated by current at charge/discharge operation. Further, in accordance with the present invention, since there is provided power supply apparatus in which energy loss by voltage drop of electric resistance when current flows in the lead terminal has been suppressed, it is possible to elongate drive duration time of electronic equipments, etc.

The invention claimed is:

1. A lead terminal for electrically connecting a first connected body and a second connected body, the lead terminal comprising:
   a welding portion in which electricity is caused to flow in the state caused to be in contact with an external terminal of the first connected body so that the welding portion is resistance-welded to the external terminal of the first connected body;
   a connecting portion connected to an external terminal of the second connected body; and
   a conductive portion positioned between the welding portion and the connecting portion, and serving to allow these portions to electrically conduct,
   wherein the lead terminal is a laminated material having at least a first conductive layer of a first conductivity and a second conductive layer of a second conductivity, and
   wherein the welding portion is constituted only by the first conductive layer that has a lower conductivity than the second conductive layer, and
   wherein the welding portion is formed so that its thickness is thinner than thickness of the conductive portion.

2. The lead terminal as set forth in claim 1, wherein plural welding portions are provided as the welding portion.

3. The lead terminal as set forth in claim 1, wherein the welding portion is a recessed portion provided at positions opposite to each other of both principal surfaces of the plate material, or a predetermined position of one principal surface of the plate material.

4. The lead terminal as set forth in claim 1, wherein in the case where plural welding spots (points) of the welding portion and the external terminal of the first connected body are provided, a slit or slits is or are formed between these welding spots.

5. The lead terminal as set forth in claim 1, wherein the connecting portion is formed so that its thickness is thinner than the thickness of the conductive portion.

6. The lead terminal as set forth in claim 1, wherein the conductive metal contains any one kind or plural kinds of nickel, nickel alloy, iron, iron alloy, stainless steel, zinc, zinc alloy, copper, copper alloy, silver, silver alloy, gold, gold alloy, platinum, platinum alloy, aluminum, aluminum alloy, molybdenum, molybdenum alloy, tungsten, tungsten alloy, titanium, titanium alloy, chromium, chromium alloy, zirconium, zirconium alloy, beryllium, beryllium alloy, rhodium, and rhodium alloy.

7. The lead terminal as set forth in claim 1, wherein the conductive portion is formed by a laminated body in which plural layers of a first conductive metal having a first conductivity and plural layers of a second conductive metal having a second conductivity are laminated.

8. The lead terminal as set forth in claim 7, wherein the welding portion consists of the first conductivity metal having the first conductivity lower than the second conductivity.

9. The lead terminal as set forth in claim 7, wherein the first conductivity metal contains any one kind or plural kinds of nickel, nickel alloy, iron, iron alloy, stainless steel, zinc, and zinc alloy, and the second conductivity metal contains any one kind or plural kinds of copper, copper alloy, silver, silver alloy, gold, gold alloy, platinum, platinum alloy, aluminum, aluminum alloy, tungsten, tungsten alloy, beryllium, beryllium alloy, rhodium, and rhodium alloy.

10. The lead terminal as set forth in claim 7, wherein the laminated body is a clad material in which the first conductivity metal and the second conductivity metal are pressurized while heating these metals in the state where they are laminated to thereby laminate and connect the first conductivity metal and the second conductivity metal.

11. The lead terminal as set forth in claim 7, wherein the laminated body is a laminated wood (plywood) in which the first conductivity metal and the second conductivity metal are pressurized while heating these metals in the state where they are laminated through conductive adhesive agent or film-shaped low melting point conductive metal therebetween so that the first conductivity metal and the second conductivity metal are laminated and connected.

12. The lead terminal as set forth in claim 7, wherein the laminated body is a laminated wood (plywood) in which the first conductivity metal and the second conductivity metal are welded to each other in the state where they are laminated to thereby laminate and connect the first conductivity metal and the second conductivity metal.

13. The lead terminal as set forth in claim 1, wherein the lead terminal is provided over a range from one edge end of the conductive portion toward opposite other edge end, and is bendable at a bending portion formed so that its thickness is thinner than thickness of the conductive portion.

14. The lead terminal as set forth in claim 1, wherein the first connected body is a battery, and the welding portion is welded to the external terminal of the battery.

* * * * *